United States Patent

Cruciani et al.

(10) Patent No.: US 7,765,329 B2
(45) Date of Patent: Jul. 27, 2010

(54) MESSAGING BETWEEN HETEROGENEOUS CLIENTS OF A STORAGE AREA NETWORK

(75) Inventors: Mark Cruciani, Lakeville, MN (US); Kenneth S. Beck, Morgan Hill, CA (US)

(73) Assignee: Silicon Graphics International, Fremont, CA (US)

( * ) Notice: Subject to any disclaimer, the term of this patent is extended or adjusted under 35 U.S.C. 154(b) by 1031 days.

(21) Appl. No.: 10/414,245

(22) Filed: Apr. 16, 2003

(65) Prior Publication Data

US 2004/0210673 A1    Oct. 21, 2004

Related U.S. Application Data

(63) Continuation-in-part of application No. 10/162,258, filed on Jun. 5, 2002, now Pat. No. 6,950,833.

(51) Int. Cl.
G06F 15/16 (2006.01)
H04L 12/28 (2006.01)
H04L 12/56 (2006.01)
H04L 12/66 (2006.01)
H04M 11/00 (2006.01)

(52) U.S. Cl. ................ 709/250; 709/218; 709/228; 709/236; 709/249; 370/395.5; 379/93.15

(58) Field of Classification Search ................ 709/218, 709/227, 228, 236, 237, 246, 249, 250; 370/352, 370/395.5; 379/93.09, 93.15
See application file for complete search history.

(56) References Cited

U.S. PATENT DOCUMENTS

| 5,440,727 | A |   | 8/1995 | Bhide et al. | |
|---|---|---|---|---|---|
| 5,774,689 | A | * | 6/1998 | Curtis et al. | 703/21 |
| 5,917,998 | A |   | 6/1999 | Cabrera et al. | |
| 5,987,566 | A |   | 11/1999 | Vishlitzky et al. | |
| 6,047,294 | A |   | 4/2000 | Deshayes et al. | |
| 6,111,893 | A | * | 8/2000 | Volftsun et al. | 370/466 |
| 6,157,635 | A | * | 12/2000 | Wang et al. | 370/352 |
| 6,279,032 | B1 |   | 8/2001 | Short et al. | |
| 6,341,339 | B1 |   | 1/2002 | Kontothanassis et al. | |
| 6,349,343 | B1 | * | 2/2002 | Foody et al. | 719/316 |

(Continued)

OTHER PUBLICATIONS

Tanenbaum, Andrew S. Structured Computer Organization, Third Edition, Prentice Hall, 1990, pp. 43-44.*

(Continued)

*Primary Examiner*—Vivek Srivastava
*Assistant Examiner*—Melvin H Pollack
(74) *Attorney, Agent, or Firm*—Baker Botts L.L.P.

(57) ABSTRACT

A cluster of computer system nodes connected by a storage area network transmit messages using a messaging protocol having multiple layers. The storage area network supports computer system nodes running different operating systems on different endian processors. A heartbeat signal is transmitted in a common wire format over the lowest level of the messaging protocol; however other messages between the nodes may be transmitted in a format different from the common wire format. The node receiving a message is responsible for converting the format as necessary in a layer just above the layer of the messaging protocol handling heartbeat signals. However, conversion may be performed by the sending node if the sending node knows the format used by the receiving node.

22 Claims, 17 Drawing Sheets

U.S. PATENT DOCUMENTS

| | | | |
|---|---|---|---|
| 6,353,837 B1* | 3/2002 | Blumenau | 707/205 |
| 6,389,451 B1* | 5/2002 | Hart | 709/201 |
| 6,453,426 B1 | 9/2002 | Gamache et al. | |
| 6,463,573 B1 | 10/2002 | Maddalozzo et al. | |
| 6,487,561 B1 | 11/2002 | Ofek et al. | |
| 6,490,631 B1* | 12/2002 | Teich et al. | 709/250 |
| 6,560,234 B1* | 5/2003 | Ben-Michael et al. | 370/401 |
| 6,651,096 B1* | 11/2003 | Gai et al. | 709/223 |
| 6,654,912 B1 | 11/2003 | Viswanathan et al. | |
| 6,674,713 B1* | 1/2004 | Berg et al. | 370/217 |
| 6,754,181 B1* | 6/2004 | Elliott et al. | 370/252 |
| 6,785,892 B1* | 8/2004 | Miller et al. | 719/313 |
| 6,799,189 B2 | 9/2004 | Huxoll | |
| 6,819,918 B2* | 11/2004 | Chin et al. | 455/411 |
| 6,832,330 B1 | 12/2004 | Boudrie et al. | |
| 6,873,627 B1* | 3/2005 | Miller et al. | 370/466 |
| 6,883,170 B1 | 4/2005 | Garcia | |
| 6,904,544 B2 | 6/2005 | DeRolf et al. | 714/43 |
| 6,948,001 B1* | 9/2005 | Bradley | 709/246 |
| 6,950,833 B2* | 9/2005 | Costello et al. | 707/201 |
| 6,952,688 B1* | 10/2005 | Goldman et al. | 706/45 |
| 6,957,439 B1* | 10/2005 | Lewallen | 719/328 |
| 6,965,569 B1* | 11/2005 | Carolan et al. | 370/238 |
| 6,965,934 B1* | 11/2005 | Reynolds et al. | 709/224 |
| 6,976,060 B2* | 12/2005 | Manczak et al. | 709/219 |
| 6,983,456 B2* | 1/2006 | Poznanovic et al. | 717/133 |
| 7,006,614 B2* | 2/2006 | Feinberg et al. | 379/164 |
| 7,043,663 B1* | 5/2006 | Pittelkow et al. | 714/4 |
| 7,072,984 B1* | 7/2006 | Polonsky et al. | 709/246 |
| 7,088,995 B2* | 8/2006 | Rao | 455/418 |
| 7,127,633 B1* | 10/2006 | Olson et al. | 714/4 |
| 7,145,898 B1* | 12/2006 | Elliott | 370/352 |
| 7,159,125 B2* | 1/2007 | Beadles et al. | 713/193 |
| 7,171,121 B1* | 1/2007 | Skarica et al. | 398/67 |
| 7,180,909 B1* | 2/2007 | Achler | 370/466 |
| 7,185,017 B1* | 2/2007 | Cauvin et al. | 707/101 |
| 7,191,433 B2* | 3/2007 | Narad et al. | 717/140 |
| 7,200,144 B2* | 4/2007 | Terrell et al. | 370/389 |
| 7,203,663 B1* | 4/2007 | Buisman et al. | 705/38 |
| 7,209,551 B1* | 4/2007 | Schroeder et al. | 379/88.13 |
| 7,225,249 B1* | 5/2007 | Barry et al. | 709/223 |
| 7,225,276 B2* | 5/2007 | Garnett et al. | 709/250 |
| 7,254,645 B2* | 8/2007 | Nishi | 709/249 |
| 7,284,191 B2* | 10/2007 | Grefenstette et al. | 715/230 |
| 7,292,567 B2* | 11/2007 | Terrell et al. | 370/363 |
| 7,315,903 B1* | 1/2008 | Bowden | 709/250 |
| 7,337,241 B2* | 2/2008 | Boucher et al. | 709/250 |
| 7,373,422 B1* | 5/2008 | Paul et al. | 709/238 |
| 7,394,761 B2* | 7/2008 | Foster et al. | 370/227 |
| 7,451,199 B2* | 11/2008 | Kandefer et al. | 709/223 |
| 7,487,509 B2* | 2/2009 | Hugly et al. | 719/310 |
| 7,559,052 B2* | 7/2009 | Kalia et al. | 717/121 |
| 7,649,908 B2* | 1/2010 | Schwalb | 370/467 |
| 2002/0165979 A1* | 11/2002 | Vincent | 709/239 |
| 2003/0028514 A1 | 2/2003 | Lord et al. | |
| 2003/0177187 A1* | 9/2003 | Levine et al. | 709/205 |
| 2003/0208750 A1* | 11/2003 | Tapper et al. | 717/177 |
| 2003/0217096 A1* | 11/2003 | McKelvie et al. | 709/202 |
| 2004/0001501 A1* | 1/2004 | Delveaux et al. | 370/442 |
| 2004/0022237 A1* | 2/2004 | Elliott et al. | 370/356 |
| 2004/0088297 A1* | 5/2004 | Coates et al. | 707/10 |
| 2004/0153841 A1* | 8/2004 | Beck | 714/42 |
| 2004/0210656 A1* | 10/2004 | Beck et al. | 709/225 |
| 2004/0215830 A1* | 10/2004 | Shenfield | 709/246 |
| 2004/0249904 A1* | 12/2004 | Moore et al. | 709/216 |
| 2004/0250113 A1* | 12/2004 | Beck | 713/201 |
| 2005/0268223 A1* | 12/2005 | Hanson et al. | 715/513 |
| 2006/0004765 A1* | 1/2006 | Anderson et al. | 707/10 |
| 2006/0148495 A1* | 7/2006 | Wilson | 455/466 |

OTHER PUBLICATIONS

Eisenhauer, Greg, et al. "Event Services for High Performance Computing," Ninth Intl. Symposium on High-Performance Distributed Computing, Aug. 1-4, 2000, pp. 113-120.*

Eisenhauer, Greg, et al. "Native Data Representation: An Efficient Wire Format for High-Performance Distributed Computing," IEEE Transactions on Parallel and Distributed Systems, vol. 13, Issue 12, Dec. 2002, pp. 1234-1246.*

McCloghrie, K. et al. "Managed Objects for Controlling the Collection and Storage of Accounting Information for Connection-Oriented Networks," RFC 2513, Feb. 1999, pp. 1-29.*

Krueger, M. et al. "Small Computer Systems Interface Protocol over the Internet (iSCSI) Requirements and Design Considerations," RFC 3347, Jul. 2002, pp. 1-26.*

Sjoberg, J. et al. "Real-Time Transport Protocol (RTP) Payload Format and File Storage Format for the Adaptive Multi-Rate (AMR) and Adaptive Multi-Rate Wideband (AMR-WB) Audio Codecs," RFC 3267, Jun. 2002, pp. 1-49.*

Eisenhauer, G. et al. "Native Data Representation: An Efficient Wire Format for High Performance Distributed Computing," IEEE Transactions on Parallel and Distributed Systems, vol. 13, Issue 12, Dec. 2002, pp. 1234-1246.*

Pinheiro, Eduardo et al. "S-DSM for Heterogeneous Machine Architectures," Computer Science Department, University of Rochester, Apr. 2000, pp. 1-7.*

Pinheiro, et al., "S-DSM for Heterogeneous Machine Architectures", Computer Science Department of University of Rochester, Apr. 2000, pp. 1-7.

Eisenhauer, et al., "Native Data Representation: An Efficient Wire Format for High-Performance Distributed Computing", IEEE, 2002 pp. 1234-1246.

* cited by examiner

MESSAGING BETWEEN HETEROGENEOUS CLIENTS OF A STORAGE AREA NETWORK

CROSS-REFERENCE TO RELATED APPLICATION(S)

This application is a continuation-in-part of U.S. patent application entitled CLUSTERED FILE SYSTEM having Ser. No. 10/162,258, by Costello et al., filed Jun. 5, 2002, now U.S. Pat. No. 6,950,833 which claims the benefit of U.S. provisional patent application entitled CLUSTERED FILE SYSTEM having Ser. No. 60/296,046, by Bannister et al., filed Jun. 5, 2001, both incorporated by reference herein. This application is also related to U.S. patent applications filed concurrently herewith entitled MULTI-CLASS HETEROGENEOUS CLIENTS IN A CLUSTERED FILESYSTEM, by Moore et al. and FAILSAFE OPERATION OF STORAGE AREA NETWORK by Kenneth S. Beck, both incorporated herein by reference.

BACKGROUND OF THE INVENTION

1. Field of the Invention

The present invention is related to messaging between nodes in a storage area network and, more particularly, to nodes controlled by different operating systems.

2. Description of the Related Art

A storage area network (SAN) provides direct, high-speed physical connections, e.g., Fibre Channel connections, between multiple hosts and disk storage. The emergence of SAN technology offers the potential for multiple computer systems to have high-speed access to shared data. However, the software technologies that enable true data sharing are mostly in their infancy. While SANs offer the benefits of consolidated storage and a high-speed data network, existing systems do not share that data as easily and quickly as directly connected storage. Data sharing is typically accomplished using a network filesystem such as Network File System (NFS™ by Sun Microsystems, Inc. of Santa Clara, Calif.) or by manually copying files using file transfer protocol (FTP), a cumbersome and unacceptably slow process.

The challenges faced by a distributed SAN filesystem are different from those faced by a traditional network filesystem. For a network filesystem, all transactions are mediated and controlled by a file server. While the same approach could be transferred to a SAN using much the same protocols, that would fail to eliminate the fundamental limitations of the file server or take advantage of the true benefits of a SAN. The file server is often a bottleneck hindering performance and is always a single point of failure. The design challenges faced by a shared SAN filesystem are more akin to the challenges of traditional filesystem design combined with those of high-availability systems.

Traditional filesystems have evolved over many years to optimize the performance of the underlying disk pool. Data concerning the state of the filesystem (metadata) is typically cached in the host system's memory to speed access to the filesystem. This caching—essential to filesystem performance—is the reason why systems cannot simply share data stored in traditional filesystems. If multiple systems assume they have control of the filesystem and cache filesystem metadata, they will quickly corrupt the filesystem by, for instance, allocating the same disk space to multiple files. On the other hand, implementing a filesystem that does not allow data caching would provide unacceptably slow access to all nodes in a cluster.

Systems or software for connecting multiple computer systems or nodes in a cluster to access data storage devices connected by a SAN have become available from several companies. EMC Corporation of Hopkington, Mass. offers HighRoad file system software for their Celerra™ Data Access in Real Time (DART) file server. Veritas Software of Mountain View, Calif. offers SANPoint which provides simultaneous access to storage for multiple servers with failover and clustering logic for load balancing and recovery. Sistina Software of Minneapolis, Minn. has a similar clustered file system called Global File System™ (GFS). Advanced Digital Information Corporation of Redmond, Wash. has several SAN products, including CentraVision for sharing files across a SAN. As a result of mergers the last few years, Hewlett-Packard Company of Palo Alto, Calif. has more than one cluster operating system offered by their Compaq Computer Corporation subsidiary which use the Cluster File System developed by Digital Equipment Corporation in their TruCluster and OpenVMS Cluster products. However, none of these products are known to provide direct read and write over a Fibre Channel by any node in a cluster. What is desired is a method of accessing data within a SAN which provides true data sharing by allowing all SAN-attached systems direct access to the same filesystem. Furthermore, conventional hierarchal storage management uses an industry standard interface called data migration application programming interface (DMAPI). However, if there are five machines, each accessing the same file, there will be five separate events and there is nothing tying those DMAPI events together.

Some filesystems are used in networks that permit heterogeneous operating systems to be connected together. For example, Tivoli® SANergy™ enables multi-OS nodes to access a SAN. As another example, NFS™ uses a common wire format that is big endian to communicate between systems that may run Solaris™ from Sun Microsystems, Inc. on SPARC® processors which are also big endian, or UNIX, LINUX or Windows® NT® on Intel® processors which are little endian. As a result, each system has to convert from their internal data format to the common wire format. Typically, not much change is required by Solaris™ systems since SPARC® processors are big endian. However, since Intel® processors are little endian, conversion by systems running on Intel® processors have to do a lot more work to convert to common wire format. If Solaris™ system is communicating with a system running on Intel® processors, conversion will be necessary, but if two systems running on Intel® processors are communicating with each other over an NFS™ network, both systems will convert to or from common wire format, even though the receiving system might be able to easily understand the data from the transmitting system with little or no conversion if they were communicating directly.

In addition, typical SAN filesystems perform data conversion at a fairly high layer of the communication path between processes. This has an advantage in that there may be more information available regarding the context of messages that need to be converted. However, this results in dispersing the program code responsible for data conversion making maintenance of the code difficult.

SUMMARY OF THE INVENTION

It is an aspect of the present invention to minimize conversion of data between heterogeneous nodes in a storage area network.

It is another aspect of the present invention to simplify maintenance of program code for converting the format of messages between heterogeneous nodes.

It is a further aspect of the present invention to enable two nodes, running similar operating systems or on processors that are similar endian, but different endian from a common wire format for messages on a network between the nodes, to transmit messages over the network without conversion to the common wire format.

It is yet another aspect of the present invention to provide the ability to run simultaneous, different protocols between nodes.

At least one of the above aspects can be attained by a method of transmitting a message over a network of nodes running different operating systems, including converting the message in a single layer of a messaging protocol by a receiving node, as required. Even though the messaging protocol supports transmission of messages after conversion by a sending node to a common wire format, a method according to the present invention does not require all messages to be in the common wire format. The message may be sent without converting when the format used by the receiving node is also used by the sending node even if different from the common wire format. According to the invention, the receiving node is responsible for converting message data format; however, when the receiving node operates on data in a format known by the sending node, the sending node may convert the data format before sending the message.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Following are several terms used herein that are in common use in describing filesystems or SANs, or are unique to the disclosed system. Several of the terms will be defined more thoroughly below.

| | |
|---|---|
| bag | indefinitely sized container object for tagged data |
| behavior chain | vnode points to head, elements are inode, and vnode operations |
| cfs or CXFS | cluster file system (CXFS is from Silicon Graphics, Inc.) |
| chandle | client handle: barrier lock, state information and an object pointer |
| CMS | cell membership services |
| CORPSE | common objects recovery for server endurance |
| dcvn | file system specific components for vnode in client, i.e., inode |
| DMAPI | data migration application programming interface |
| DNS | distributed name service, such as SGI's white pages |
| dsvn | cfs specific components for vnode in server, i.e., node |
| heartbeat | network message indicating a node's presence on a LAN |
| HSM | hierarchial storage management |
| inode | file system specific information, i.e., metadata |
| KORE | kernel object relocation engine |
| manifest | bag included object handle and pointer for each data structure |
| quiesce | render quiescent, i.e., temporarily inactive or disabled |
| RPC | remote procedure call |
| token | an object having states used to control access to data & metadata |
| vfs | virtual file system representing the file system itself |
| vnode | virtual inode to manipulate files without file system details |
| XVM | volume manager for CXFS |

In addition there are three types of input/output operations that can be performed in a system according to the present invention: buffered I/O, direct I/O and memory mapped I/O. Buffered I/O are read and write operations via system calls where the source or result of the I/O operation can be system memory on the machine executing the I/O, while direct I/O are read and write operations via system calls where the data is transferred directly between the storage device and the application programs memory without being copied through system memory.

Memory mapped I/O are read and write operations performed by page fault. The application program makes a system call to memory map a range of a file. Subsequent read memory accesses to the memory returned by this system call cause the memory to be filled with data from the file. Write accesses to the memory cause the data to be stored in the file. Memory mapped I/O uses the same system memory as buffered I/O to cache parts of the file.

Figure 1:
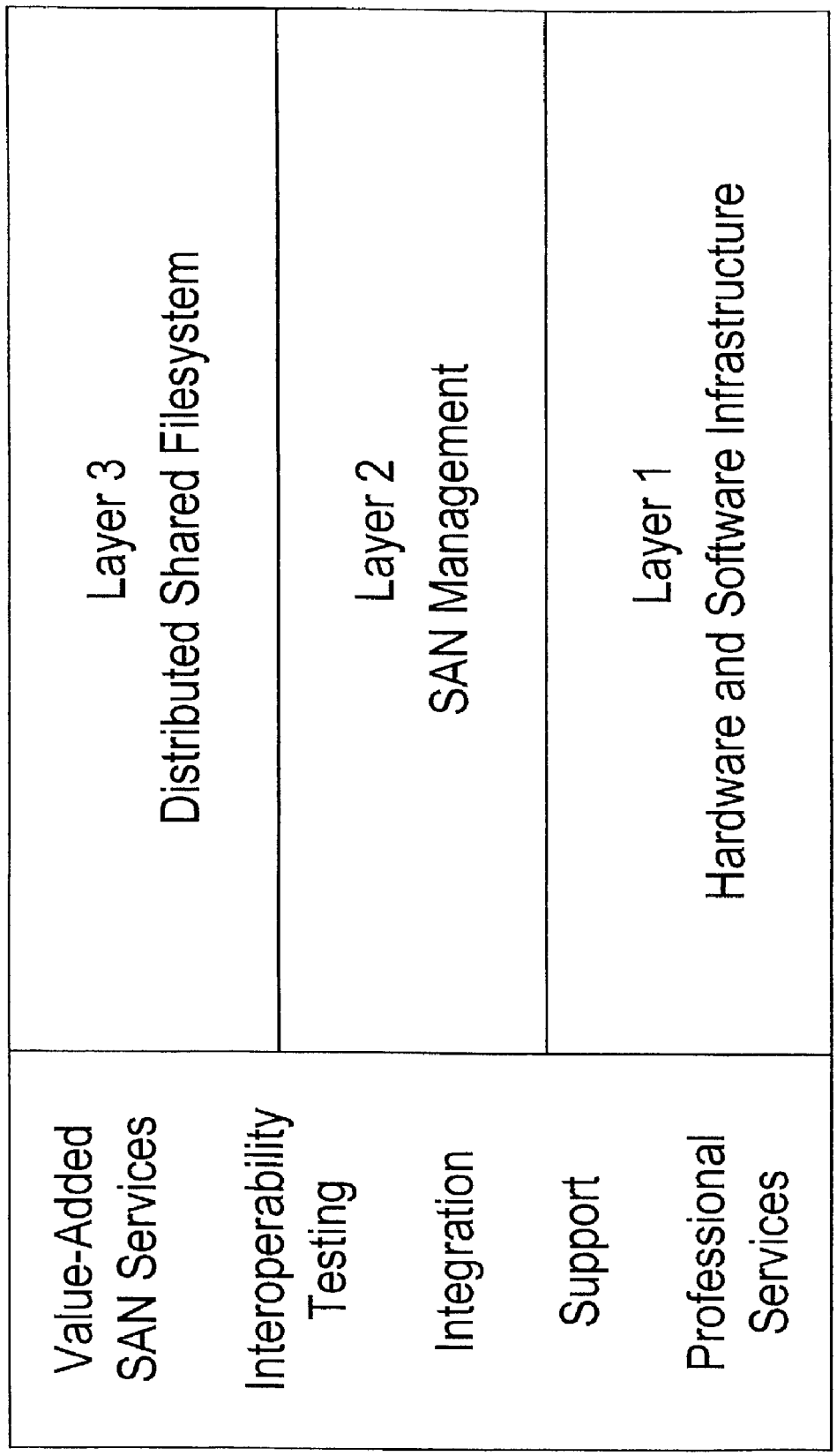
FIG. 1 is a layer model of a storage area network.

A SAN layer model is illustrated in FIG. 1. SAN technology can be conveniently discussed in terms of three distinct layers. Layer 1 is the lowest layer which includes basic hardware and software components necessary to construct a working SAN. Recently, layer 1 technology has become widely available, and interoperability between vendors is improving rapidly. Single and dual arbitrated loops have seen the earliest deployment, followed by fabrics of one or more Fibre Channel switches.

Layer 2 is SAN management and includes tools to facilitate monitoring and management of the various components of a SAN. All the tools used in direct-attach storage environments are already available for SANs. Comprehensive LAN management style tools that tie common management functions together are being developed. SAN management will soon become as elegant as LAN management.

The real promise of SANs, however, lies in layer 3, the distributed, shared filesystem. Layer 1 and layer 2 components allow a storage infrastructure to be built in which all SAN-connected computer systems potentially have access to all SAN-connected storage, but they don't provide the ability to truly share data. Additional software is required to mediate and manage shared access, otherwise data would quickly become corrupted and inaccessible.

In practice, this means that on most SANs, storage is still partitioned between various systems. SAN managers may be able to quickly reassign storage to another system in the face of a failure and to more flexibly manage their total available storage, but independent systems cannot simultaneously access the same data residing in the same filesystems.

Shared, high-speed data access is critical for applications where large data sets are the norm. In fields as diverse as satellite data acquisition and processing, CAD/CAM, and seismic data analysis, it is common for files to be copied from a central repository over the LAN to a local system for processing and then copied back. This wasteful and inefficient process can be completely avoided when all systems can access data directly over a SAN.

Shared access is also crucial for clustered computing. Access controls and management are more stringent than with network filesystems to ensure data integrity. In most existing high-availability clusters, storage and applications are partitioned and another server assumes any failed server's storage and workload. While this may prevent denial of service in case of a failure, load balancing is difficult and system and storage bandwidth is often wasted. In high-performance computing clusters, where workload is split between multiple systems, typically only one system has direct data access. The other cluster members are hampered by slower data access using network file systems such as NFS™.

In a preferred embodiment, the SAN includes hierarchical storage management (HSM) such as data migration facility (DMF) by Silicon Graphics, Inc. (SGI) of Mountain View, Calif. The primary purpose of HSM is to preserve the economic value of storage media and stored data. The high input/output bandwidth of conventional machine environments is sufficient to overrun online disk resources. HSM transparently solves storage management issues, such as managing private tape libraries, making archive decisions, and journaling the storage so that data can be retrieved at a later date.

Preferably, a volume manager, such as XVM from SGI supports the cluster environment by providing an image of storage devices across all nodes in a cluster and allowing for administration of the devices from any cell in the cluster. Disks within a cluster can be assigned dynamically to the entire cluster or to individual nodes within the cluster. In one embodiment, disk volumes are constructed using XVM to provide disk striping, mirroring, concatenation and advanced recovery features. Low-level mechanisms for sharing disk volumes between systems are provided, making defined disk volumes visible across multiple systems. XVM is used to combine a large number of disks across multiple Fibre Channels into high transaction rate, high bandwidth, and highly reliable configurations. Due to its scalability, XVM provides an excellent complement to CXFS and SANs. XVM is designed to handle mass storage growth and can configure millions of terabytes (exabytes) of storage in one or more filesystems across thousands of disks.

Figure 2:
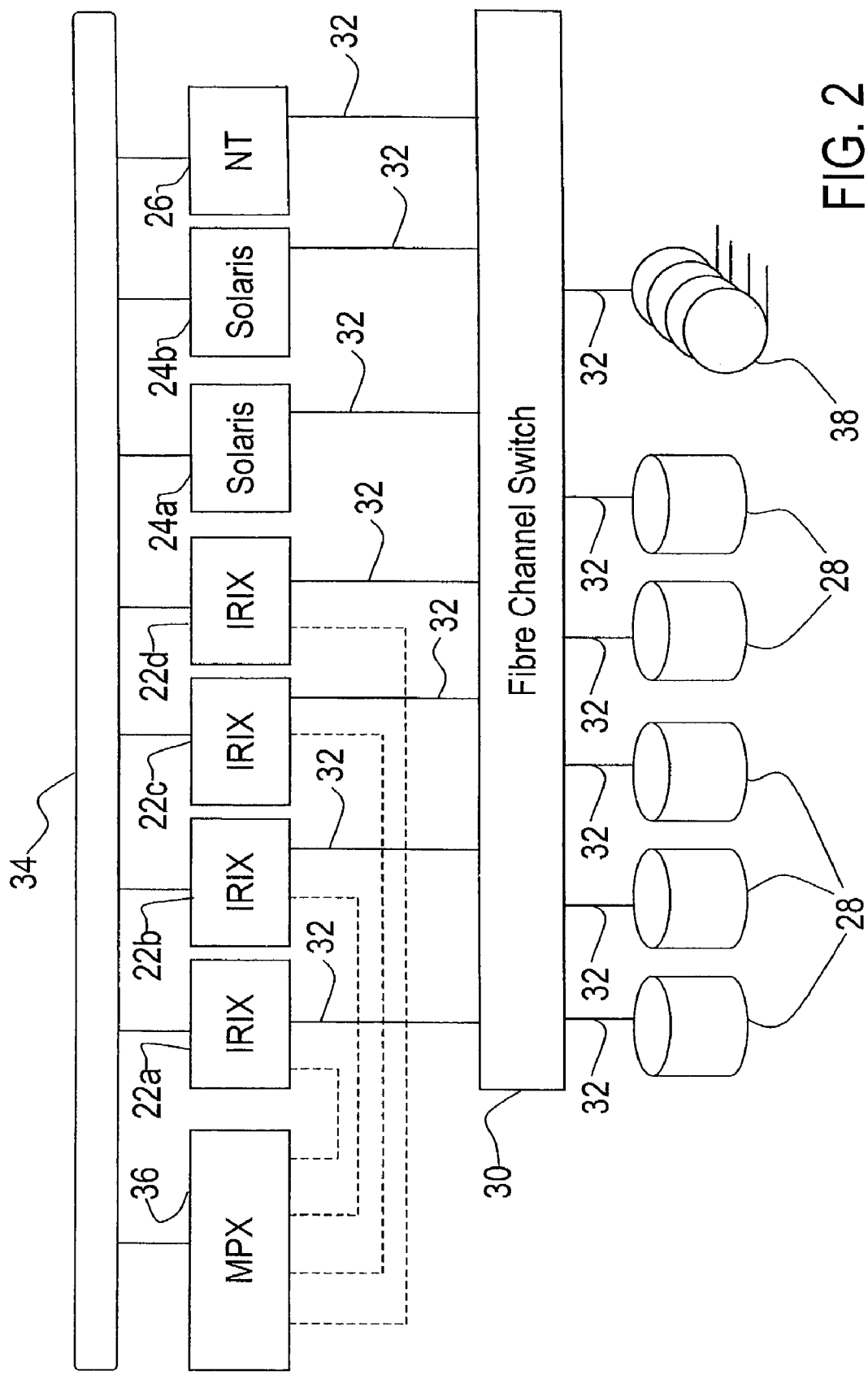
FIG. 2 is a block diagram of a cluster computing system.

An example of a cluster computing system formed of heterogeneous computer systems or nodes is illustrated in FIG. 2. In the example illustrated in FIG. 2, nodes 22 run the IRIX® operating system from SGI while nodes 24 run the Solaris™ operating system from Sun and node 26 runs the Windows® NT® operating system from Microsoft Corporation of Redmond Wash. Each of these nodes is a conventional computer system including at least one, and in many cases several processors, local or primary memory, some of which is used as a disk cache, input/output (I/O) interfaces, I/O devices, such as one or more displays or printers. According to the present invention, the cluster includes a storage area network in which mass or secondary storage, such as disk drives 28 are connected to the nodes 22, 24, 26 via Fibre Channel switch 30 and Fibre Channel connections 32. The nodes 22, 24, 26 are also connected via a local area network (LAN) 34, such as an Ethernet, using TCP/IP to provide messaging and heartbeat signals (discussed below in more detail). In the preferred embodiment, a serial port multiplexer 36 is also connected to the LAN and to a serial port of each node to enable hardware reset of the node. In the example illustrated in FIG. 2, only IRIX® nodes 22 are connected to serial port multiplexer 36.

Other kinds of storage devices besides disk drives 28 may be connected to the Fibre Channel switch 30 via Fibre Channel connections 32. Tape drives 38 are illustrated in FIG. 2, but other conventional storage devices may also be connected. Alternatively, tape drives 38 (or other storage devices) may be connected to one or more of nodes 22, 24, 26, e.g., via SCSI connections (not shown).

In a conventional SAN, the disks are partitioned for access by only a single node per partition and data is transferred via the LAN. On the other hand, if node 22c needs to access data in a partition to which node 22b has access, according to the present invention very little of the data stored on disk 28 is transmitted over LAN 34. Instead LAN 34 is used to send metadata describing the data stored on disk 28, token messages controlling access to the data, heartbeat signals and other information related to cluster operation and recovery.

In the preferred embodiment, the cluster filesystem is layer that distributes input/output directly between the disks and the nodes via Fibre Channel 30,32 while retaining an underlying layer with an efficient input/output path using asynchronous buffering techniques to avoid unnecessary physical input/outputs by delaying writes as long as possible. This allows the filesystem to allocate the data space efficiently and often contiguously. The data tends to be allocated in large contiguous chunks, which yields sustained high bandwidths.

Preferably, the underlying layer uses a directory structure based on B-trees, which allow the cluster filesystem to maintain good response times, even as the number of files in a directory grows to tens or hundreds of thousands of files. The cluster filesystem adds a coordination layer to the underlying filesystem layer. Existing filesystems defined in the underlying layer can be migrated to a cluster filesystem according to the present invention without necessitating a dump and restore (as long as the storage can be attached to the SAN). For example, in the IRIX® nodes 22, XVM is used for volume management and XFS is used for filesystem access and control. Thus, the cluster filesystem layer is referred to as CXFS.

Figure 3:
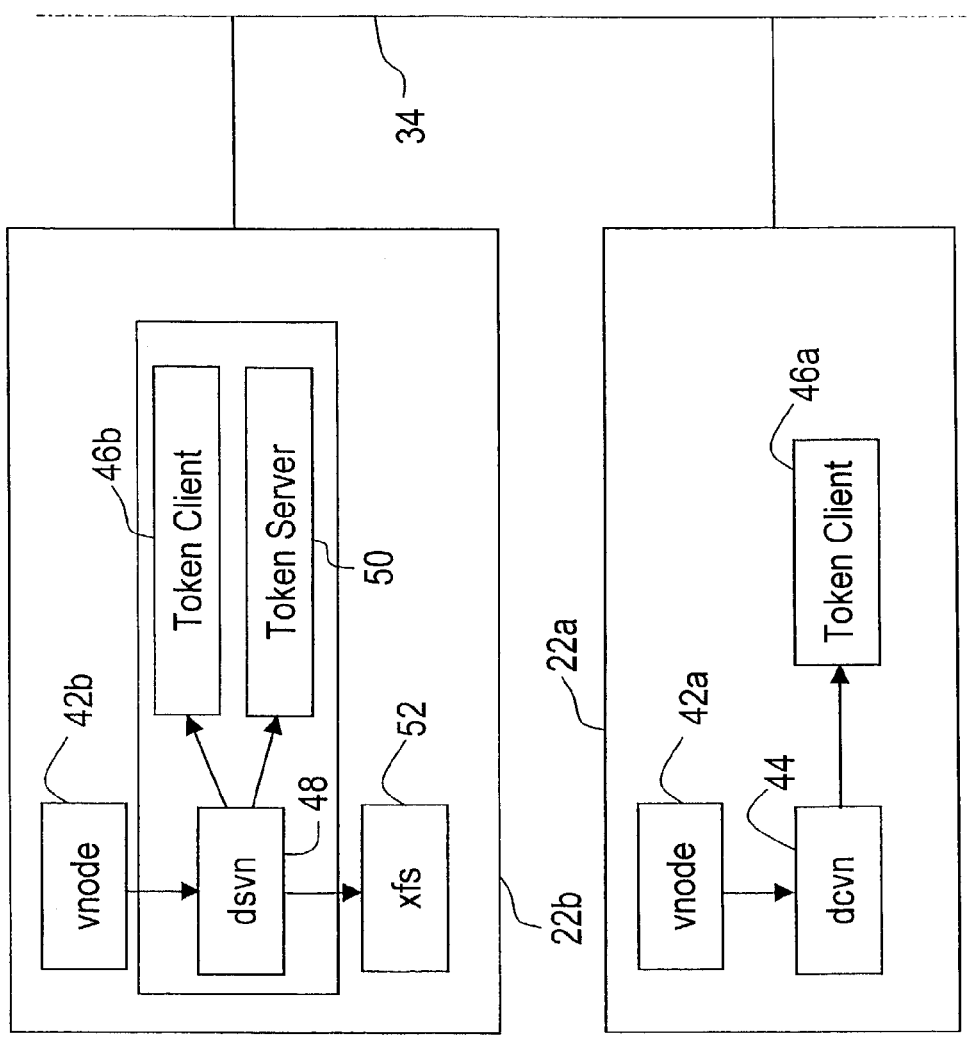
FIG. 3 is a block diagram of filesystem specific and non-specific layers in a metadata server and a metadata client.

In the cluster file system of the preferred embodiment, one of the nodes, e.g., IRIX® node 22b, is a metadata server for the other nodes 22, 24, 26 in the cluster which are thus metadata clients with respect to the file system(s) for which node 22b is a metadata server. Other node(s) may serve as metadata server(s) for other file systems. All of the client nodes 22, 24 and 26, including metadata server 22b, provide direct access to files on the filesystem. This is illustrated in FIG. 3 in which "vnode" 42 presents a file system independent set of operations on a file to the rest of the operating system. In metadata client 22a the vnode 42 services requests using the clustered filesystem routines associated with dcvn 44 which include token client operations 46 described in more detail below. However, in metadata server 22b, the file system requests are serviced by the clustered filesystem routines associated with dsvn 48 which include token client operations 46 and token server operations 50. The metadata server 22b also maintains the metadata for the underlying filesystem, in this case XFS 52.

Figure 4:
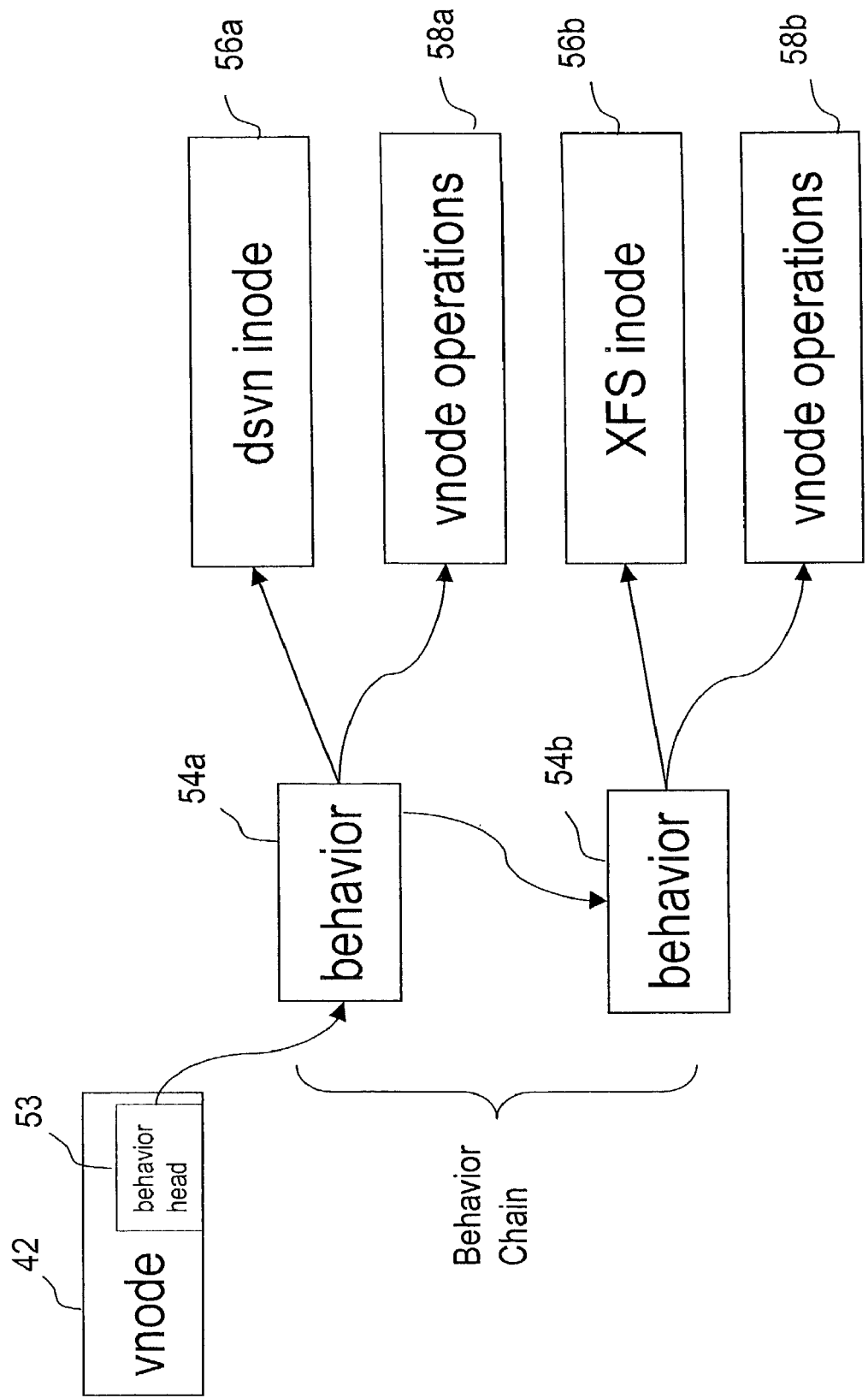
FIG. 4 is a block diagram of behavior chains.

As illustrated in FIG. 4, according to the present invention a vnode 52 contains the head 53 of a chain of behaviors 54. Each behavior points to a set of vnode operations 58 and a filesystem specific inode data structure 56. In the case of files which are only being accessed by applications running directly on the metadata server 22b, only behavior 54b is present and the vnode operations are serviced directly by the underlying filesystem, e.g., XFS. When the file is being accessed by applications running on client nodes then behavior 54a is also present. In this case the vnode operations 58a manage the distribution of the file metadata between nodes in the cluster, and in turn use vnode operations 58b to perform requested manipulations of the file metadata. The vnode operations 58 are typical file system operations, such as create, lookup, read, write.

Messaging and Heartbeat Signals

As discussed above, LAN 34 is used to transmit token messages, heartbeat signals and other information. The content of token messages and the use of heartbeat signals is discussed below, but first the formatting of the messages on LAN 34 will be described.

The heartbeat signals typically use a common wire format like that of some other messages on LAN 34 generated by nodes 22, 24, 26. Preferably, each heartbeat signal includes an architecture code identifying the data format used by the node that generated the heartbeat signal. This enables nodes 22, 24, 26 to determine a data format other than common wire format in which messages can be transmitted. For example, in a CXFS cluster, the common wire format is similar to the internal format of data in IRIX® nodes 22. However, if Solaris™ node 24a wants to send data to Solaris™ node 24b, it is preferable to not require conversion of data formats. This is particularly desirable if the message is being sent between two nodes that both use processors that are same endian, but different endian from the common wire format, such as two Windows® NT® nodes 26 using Intel® processors that are little endian, unlike the big endian processors of IRIX® nodes 22.

As much as possible, it is preferable for message data format conversion to occur at most only once and only to the extent necessary. In the preferred embodiment, the receiving node is responsible for ensuring that the data is formatted properly. This is referred to as "reader-makes-right." To facilitate inclusion and participation of new architectures into the cluster without upgrading other members, preferably a server/client connection between well-known nodes can rely on reader-makes-right conversion, whereas a server/client connection where the client architecture is new and unknown can communicate via common wire format. The portions of a message that require translation differ depending on data type (integer, etc) and size. Some types like ASCII character strings do not require translation. Endianness conversions and field-reordering are two examples of transformations that occur during the process of translation.

Optionally, where conversion occurs may be flexible. As noted above, in the preferred embodiment, the receiving node is responsible for formatting data correctly. However, when the sending node is aware of the format requirements of the receiving node, it may be easier for the sending node to perform data conversion, since the sending node is likely to be intimately familiar with the data prior to conversion. Thus, the receiving node could inform the sending node of its format requirements and request the sending node to format the data appropriately.

Figure 15:
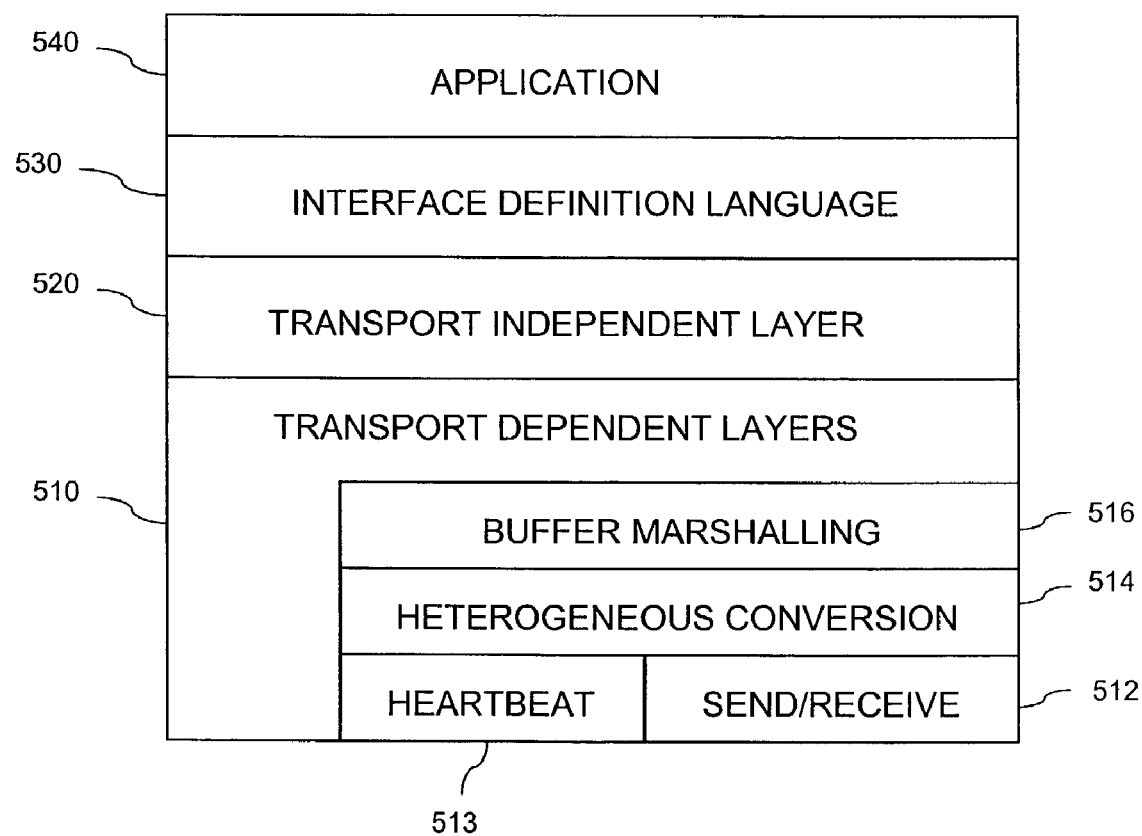
FIG. 15 is a block diagram of layers in the messaging protocol.

Regardless of whether performed by the sending or receiving node, in the preferred embodiment, all message data format conversion occurs in a low layer of the messaging protocol. As illustrated in FIG. 15, the lowest layers 510 of the messaging protocol in the preferred embodiment are transport dependent, starting with a transport layer 512 which transmits all messages, including heartbeat signal 513. The next lowest layer 514 preferably is used to convert the message data format and is referred to as the heterogeneous conversion layer. Heterogeneous conversion layer 514 is defined by a set of entry and exit points for all messages transmitted over LAN 34. Buffer marshalling layer 516 is another transport dependent layer above heterogeneous conversion layer 514. Above the transport dependent layers 510 are conventional transport independent layer 520, interface definition language layer 530 and application layer 540.

To enable data conversion to occur in heterogeneous conversion layer 514, it is necessary to provide the context of the data before and after conversion. Therefore, all data is directly encoded or tagged by the software (e.g., CXFS, XVM) to provide an unambiguous context so that heterogeneous conversion layer 514 can perform conversion of the data as required. This tagging happens prior to entrance to heterogeneous conversion layer 514 at the individual points where data that travels over LAN 34 is created.

Token Infrastructure

The tokens operated on by the token client 46 and token server 50 in an exemplary embodiment are listed below. Each token may have three levels, read, write, or shared write. Token clients 46a and 46b (FIG. 3) obtain tokens from the token server 50. Each of the token levels, read, shared write and write, conflicts with the other levels, so a request for a token at one level will result in the recall of all tokens at different levels prior to the token being granted to the client which requested it. The write level of a token also conflicts with other copies of the write token, so only one client at a time can have the write token. Different tokens are used to protect access to different parts of the data and metadata associated with a file.

Certain types of write operations may be performed simultaneously by more than one client, in which case the shared write level is used. An example is maintaining the timestamps for a file. To reduce overhead, when reading or writing a file, multiple clients can hold the shared write level and each update the timestamps locally. If a client needs to read the timestamp, it obtains the read level of the token. This causes all the copies of the shared write token to be returned to the metadata server 22b along with each client's copy of the file timestamps. The metadata server selects the most recent timestamp and returns this to the client requesting the information along with the read token.

Acquiring a token puts a reference count on the token, and prevents it from being removed from the token client. If the token is not already present in the token client, the token server is asked for it. This is sometimes also referred to as obtaining or holding a token. Releasing a token removes a reference count on a token and potentially allows it to be returned to the token server. Recalling or revoking a token is the act of asking a token client to give a token back to the token server. This is usually triggered by a request for a conflicting level of the token.

When a client needs to ask the server to make a modification to a file, it will frequently have a cached copy of a token at a level which will conflict with the level of the token the server will need to modify the file. In order to minimize network traffic, the client 'lends' its read copy of the token to the server for the duration of the operation, which prevents the server from having to recall it. The token is given back to the client at the end of the operation.

Following is a list of tokens in an exemplary embodiment:

DVN_EXIST is the existence token. Represents the fact that a client has references to the vnode. Each client which has a copy of the inode has the read level of this token and keeps it until they are done with the inode. The client does not acquire and release this token around operations, it just keeps it in the token client. The server keeps one reference to the vnode (which keeps it in memory) for each client which has an existence token. When the token is returned, this reference count is dropped. If someone unlinks the file—which means it no longer has a name, then the server will conditionally recall all the existence tokens. A conditional recall means the client is allowed to refuse to send the token back. In this case the clients will send back all the tokens and state they have for the vnode if no application is currently using it. Once all the existence tokens are returned, the reference count on the server's vnode drops to zero, and this results in the file being removed from the filesystem.

DVN_IOEXCL is the I/O exclusive token. The read token is obtained by any client making read or write calls on the vnode. The token is held across read and write operations on the file. The state protected by this token is what is known as the I/O exclusive state. This state is cached on all the clients holding the token. If the state is true then the client knows it is the only client performing read/write operations on the file. The server keeps track of when only one copy of the token has been granted to a client, and before it will allow a second copy to be given out, it sends a message to the first client informing it that the I/O exclusive state has changed from true to false. When a client has an I/O exclusive state of true is allowed to cache changes to the file more aggressively than otherwise.

DVN_IO is the IO token which is used to synchronize between read and write calls on different computers. CXFS enforces a rule that buffered reads are atomic with respect to buffered writes, and writes are atomic with respect to other writes. This means that a buffered read operation happens before or after a write, never during a write. Buffered read operations hold the read level of the token, buffered writes hold the write level of the token. Direct reads and writes hold the read level of the token.

DVN_PAGE_DIRTY represents the right to hold modified file data in memory on a system.

DVN_PAGE_CLEAN represents the right to hold unmodified file data in memory on a computer. Combinations of levels of DVN_PAGE_DIRTY and DVN_PAGE_CLEAN are used to maintain cache coherency across the cluster.

DVN_NAME is the name token. A client with this token in the token client for a directory is allowed to cache the results of lookup operations within the directory. So if we have a name we are looking up in a directory, and we have done the same lookup before, the token allows us to avoid sending the lookup to the server. An operation such as removing or renaming, or creating a file in a directory will obtain the write level of the token on the server and recall the read token—invalidating any cached names for that directory on those clients.

DVN_ATTR protects fields such as the ownership information, the extended attributes of the file, and other small pieces of information. Held by the client for read, and by the server for write when the server is making modifications. Recall of the read token causes the invalidation of the extended attribute cache.

DVN_TIMES protects timestamp fields on the file. Held at the read level by hosts who are looking at timestamps, held at the shared write level by hosts doing read and write operations, and held at the write level on the server when setting timestamps to an explicit value. Recall of the shared write token causes the client to send back its modified timestamps, the server uses the largest of the returned values as the true value of the timestamp.

DVN_SIZE protects the size of the file, and the number of disk blocks in use by the file. Held for read by a client who wants to look at the size, or for write by a client who has a true IO exclusive state. This allows the client to update the size of the file during write operations without having to immediately send the updated size back to the server.

DVN_EXTENT protects the metadata which indicates where the data blocks for a file are on disk, known as the extent information. When a client needs to perform read or write operation it obtains the read level of the token and gets of a copy of the extent information with it. Any modification of the extent information is performed on the server and is protected by the write level of the token. A client which needs space allocated in the file will lend its read token to the server for this operation.

DVN_DMAPI protects the DMAPI event mask. Held at the read level during IO operations to prevent a change to the DMAPI state of the file during the IO operation. Only held for write by DMAPI on the server.

Data coherency is preferably maintained between the nodes in a cluster which are sharing access to a file by using combinations of the DVN_PAGE_DIRTY and DVN_PAGE_CLEAN tokens for the different forms of input/output. Buffered and memory mapped read operations hold the DVN_PAGE_CLEAN_READ token, while buffered and memory mapped write operations hold the DVN_PAGE_CLEAN_WRITE and VN_PAGE_DIRTY_WRITE tokens. Direct read operations hold the DVN_PAGE_CLEAN_SHARED_WRITE token and direct write operations hold the DVN_PAGE_CLEAN_SHARED_WRITE and VN_PAGE_DIRTY_SHARED_WRITE tokens. Obtaining these tokens causes other nodes in the cluster which hold conflicting levels of the tokens to return their tokens. Before the tokens are returned, these client nodes perform actions on their cache of file contents. On returning the DVN_PAGE_DIRTY_WRITE token a client node must first flush any modified data for the file out to disk and then discard it from cache. On returning the DVN_PAGE_CLEAN_WRITE token a client node must first flush any modified data out to disk. If both of these tokens are being returned then both the flush and discard operations are performed. On returning the DVN_PAGE_CLEAN_READ token to the server, a client node must first discard any cached data for the file it has in system memory.

Figure 5:
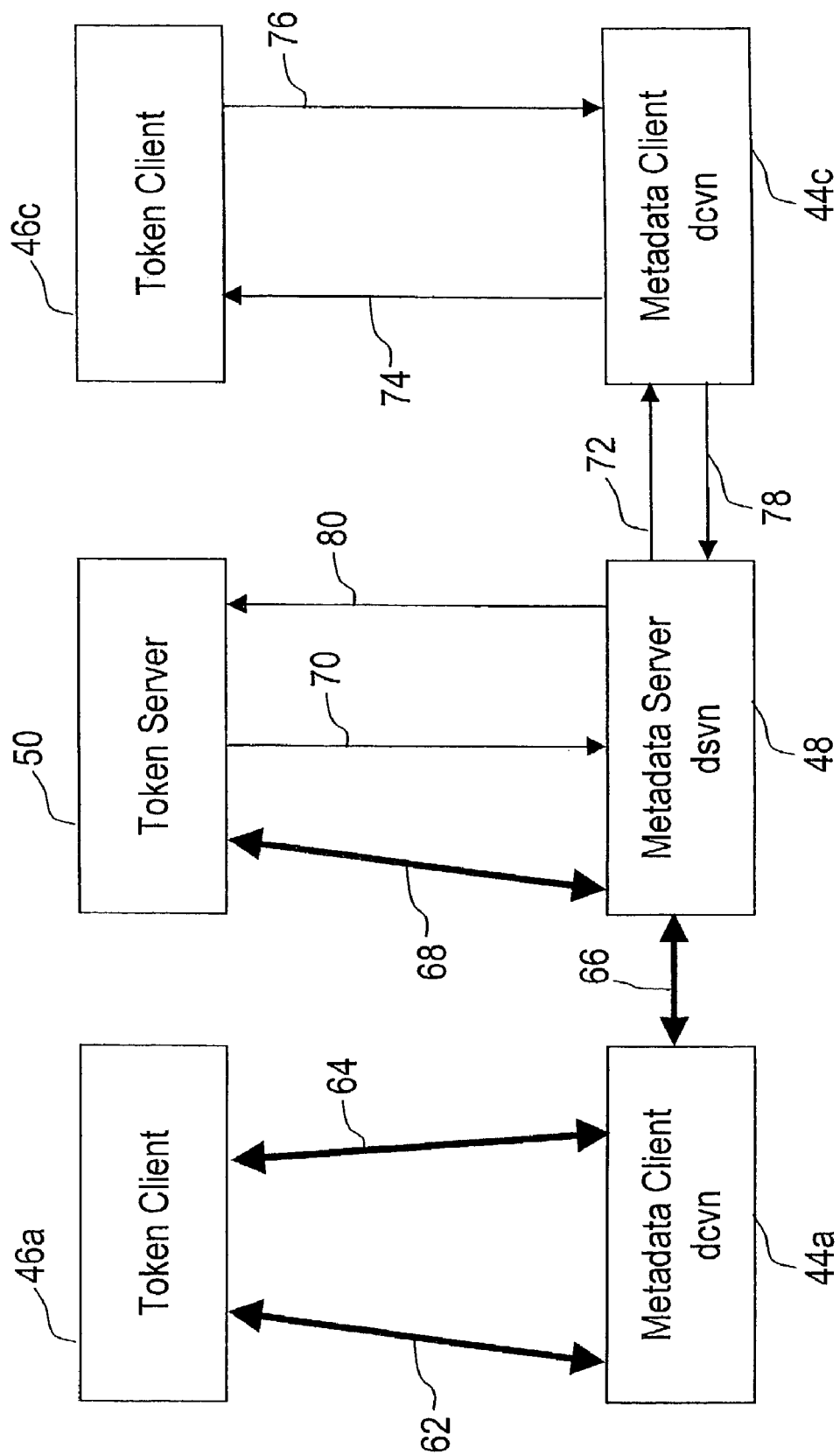
FIG. 5 is a block diagram showing the request and return of tokens.

An illustration to aid in understanding how tokens are requested and returned is provided in FIG. 5. A metadata client (dcvn) needs to perform an operation, such as a read operation on a file that has not previously been read by that process. Therefore, metadata client 44a sends a request on path 62 to token client 46a at the same node, e.g., node 22a. If another client process at that node has obtained the read token for the file, token client 46a returns the token to object client 44a and access to the file by the potentially competing processes is controlled by the operating system of the node. If token client 46a does not have the requested read token, object client 44a is so informed via path 64 and metadata client 44a requests the token from metadata server (dsvn) 48 via path 66. Metadata server 48 requests the read token from token server 50 via path 68. If the read token is available, it is returned via paths 68 and 66 to metadata client 44a which passes the token on to token client 46a. If the read token is not available, for example if metadata client 44c has a write token, the write token is revoked via paths 70 and 72.

If metadata client 44a had wanted a write token in the preceding example, the write token must be returned by metadata client 44c. The request for the write token continues from metadata client 44c to token client 46c via path 74 and is returned via paths 76 and 78 to metadata server 48 which forwards the write token to token server 50 via path 80. Once token server 50 has the write token, it is supplied to metadata client 44a via paths 68 and 66 as in the case of the read token described above.

Appropriate control of the tokens for each file by metadata server 48 at node 22b enables nodes 22, 24, 26 in the cluster to share all of the files on disk 28 using direct access via Fibre Channel 30, 32. To maximize the speed with which the data is accessed, data on the disk 28 are cached at the nodes as much as possible. Therefore, before returning a write token, the metadata client 44 flushes the write cache to disk. Similarly, if it is necessary to obtain a read token, the read cache is marked invalid and after the read token is obtained, contents of the file are read into the cache.

Mounting of a filesystem as a metadata server is arbitrated by a distributed name service (DNS), such as "white pages" from SGI. A DNS server runs on one of the nodes, e.g., node 22c, and each of the other nodes has DNS clients. Subsystems such as the filesystem, when first attempting to mount a filesystem as the metadata server, first attempt to register a filesystem identifier with the distributed name service. If the identifier does not exist, the registration succeeds and the node mounts the filesystem as the server. If the identifier is already registered, the registration fails and the contents of the existing entry for the filesystem identifier are returned, including the node number of the metadata server for the filesystem.

Hierarchical Storage Management

Figure 6:
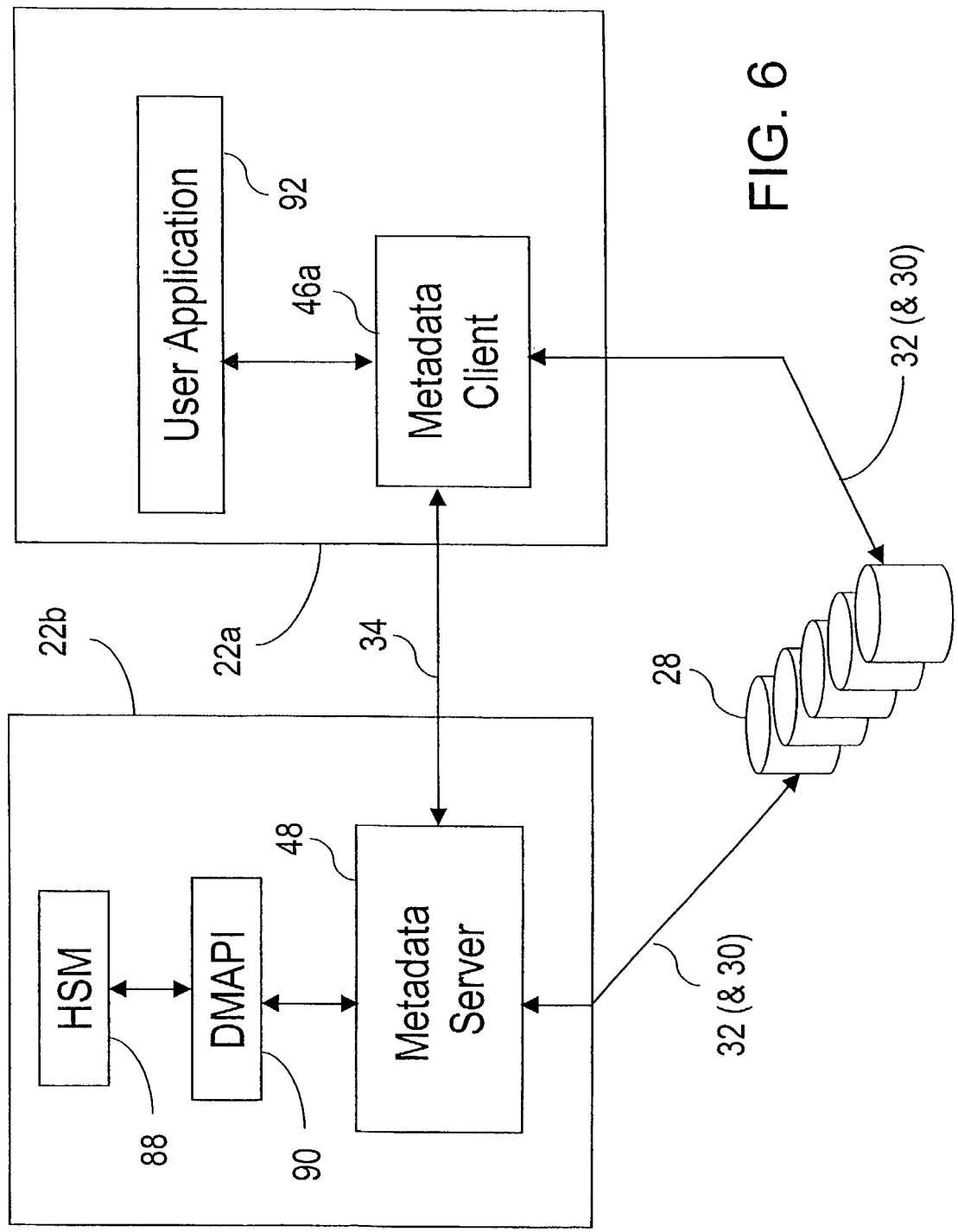
FIG. 6 is a block diagram of integration between a data migration facility server and a client node.

In addition to caching data that is being used by a node, in the preferred embodiment hierarchical storage management (HSM), such as the data migration facility (DMF) from SGI, is used to move data to and from tertiary storage, particularly data that is infrequently used. As illustrated in FIG. 6, process(es) that implement HSM 88 preferably execute on the same node 22b as metadata server 48 for the file system(s) under hierarchical storage management. Also residing on node 22b are the objects that form DMAPI 90 which interfaces between HSM 88 and metadata server 48.

Figure 7:
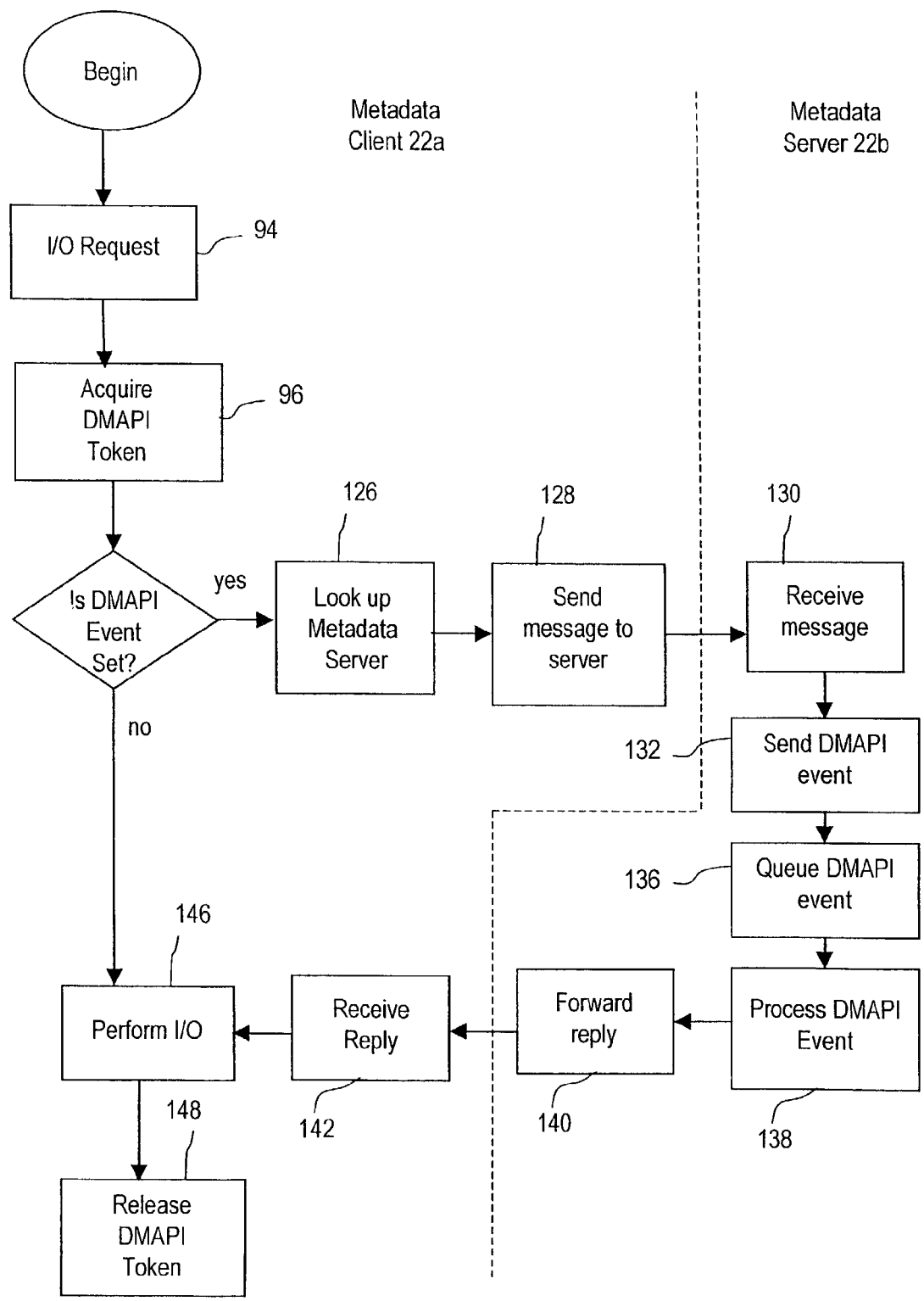
FIGS. 7 and 8 are flowcharts of operations performed to access data under hierarchical storage management.
Figure 8:
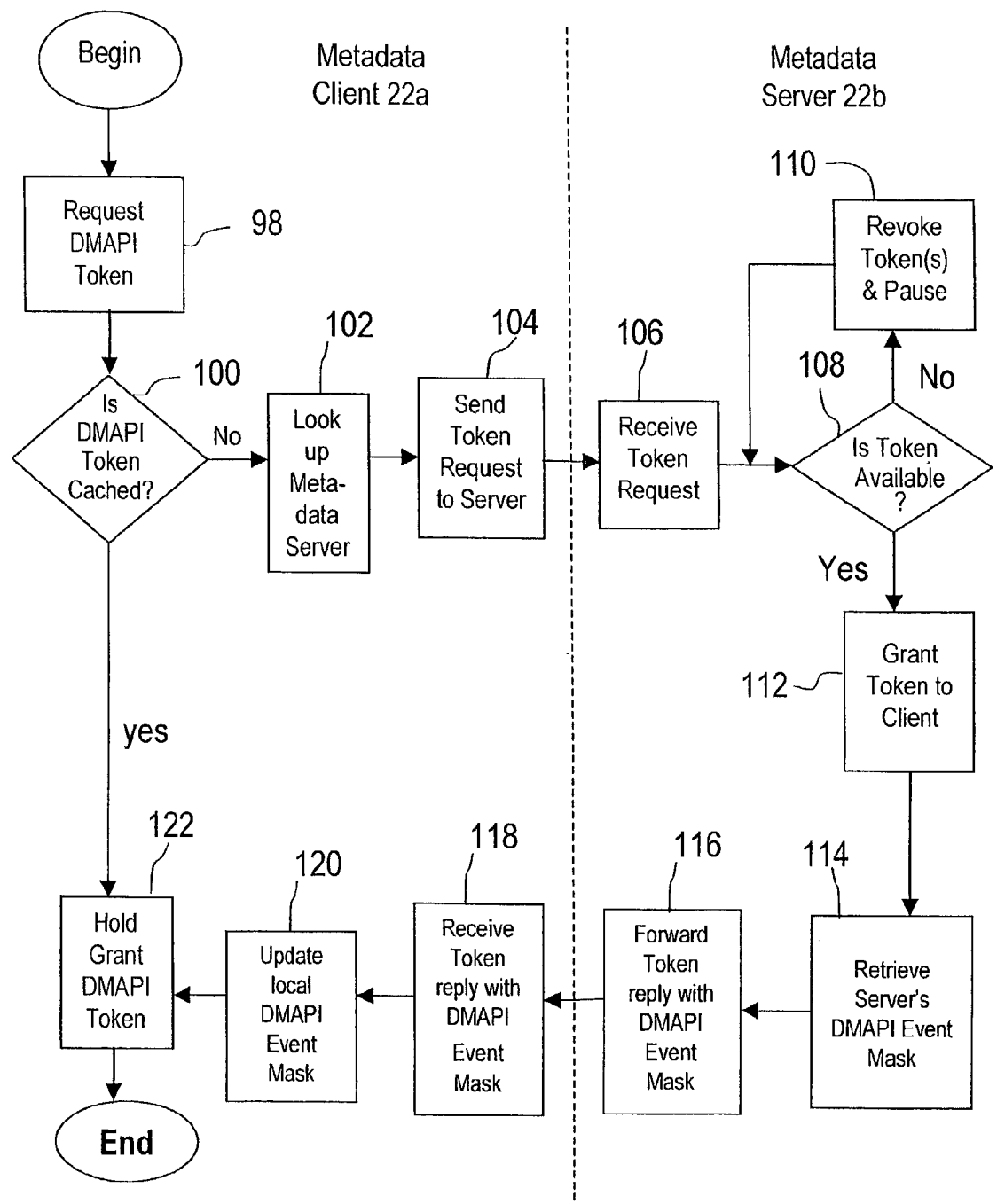

Flowcharts of the operations performed when client node 22a requests access to data under hierarchical storage management are provided in FIGS. 7 and 8. When user application 92 (FIG. 6) issues I/O requests 94 (FIG. 7) the DMAPI token must be acquired 96. This operation is illustrated in FIG. 8 where a request for the DMAPI token is issued 98 to metadata client 46a. As discussed above with respect to FIG. 5, metadata client 46a determines 100 whether the DMAPI token is held at client node 22a. If not, a lookup operation on the metadata server 22b and the token request is sent. When metadata server 22b receives 206 the token request, it is determined 108 whether the token is available. If not, the conflicting tokens are revoked 110 and metadata server 22b pauses or goes into a loop until the token can be granted 112. Files under hierarchical storage management have a DMAPI event mask (discussed further below) which is then retrieved 114 and forwarded 116 with the DMAPI token. Metadata client 22a receives 118 the token and the DMAPI event mask and updates 120 the local DMAPI event mask. The DMAPI token is then held 222 by token client 46a.

As illustrated in FIG. 7, next the DMAPI event mask is checked to determined 124 whether a DMAPI event is set, i.e., to determine whether the file to be accessed is under hierarchical storage management. If so, another lookup 126 of the metadata server is performed as in step 102 so that a message can be sent 128 to the metadata server informing the metadata server 22b of the operation to be performed. When server node 22b receives 130 the message, metadata server 48 sends 132 notification of the DMAPI event to DMAPI 90 (FIG. 6). The DMAPI event is queued 136 and subsequently processed 138 by DMAPI 90 and HSM 88.

The possible DMAPI events are read, write and truncate. When a read event is queued, the DMAPI server informs the HSM software to ensure that data is available on disks. If necessary, the file requested to be read is transferred from tape to disk. If a write event is set, the HSM software is informed that the tape copy will need to be replaced or updated with the contents written to disk. Similarly, if a truncate event is set, the appropriate change in file size is performed, e.g., by writing the file to disk, adjusting the file size and copying to tape.

Upon completion of the DMAPI event, a reply is forwarded 140 by metadata server 50 to client node 22a which receives 142 the reply and user application 92 performs 146 input/output operations. Upon completion of those operations, the DMAPI token is released 148.

Maintaining System Availability

In addition to high-speed disk access obtained by caching data and shared access to disk drives via a SAN, it is desirable to have high availability of the cluster. This is not easily accomplished with so much data being cached and multiple nodes sharing access to the same data. Several mechanisms are used to increase the availability of the cluster as a whole in the event of failure of one or more of the components or even an entire node, including a metadata server node.

Figure 9:
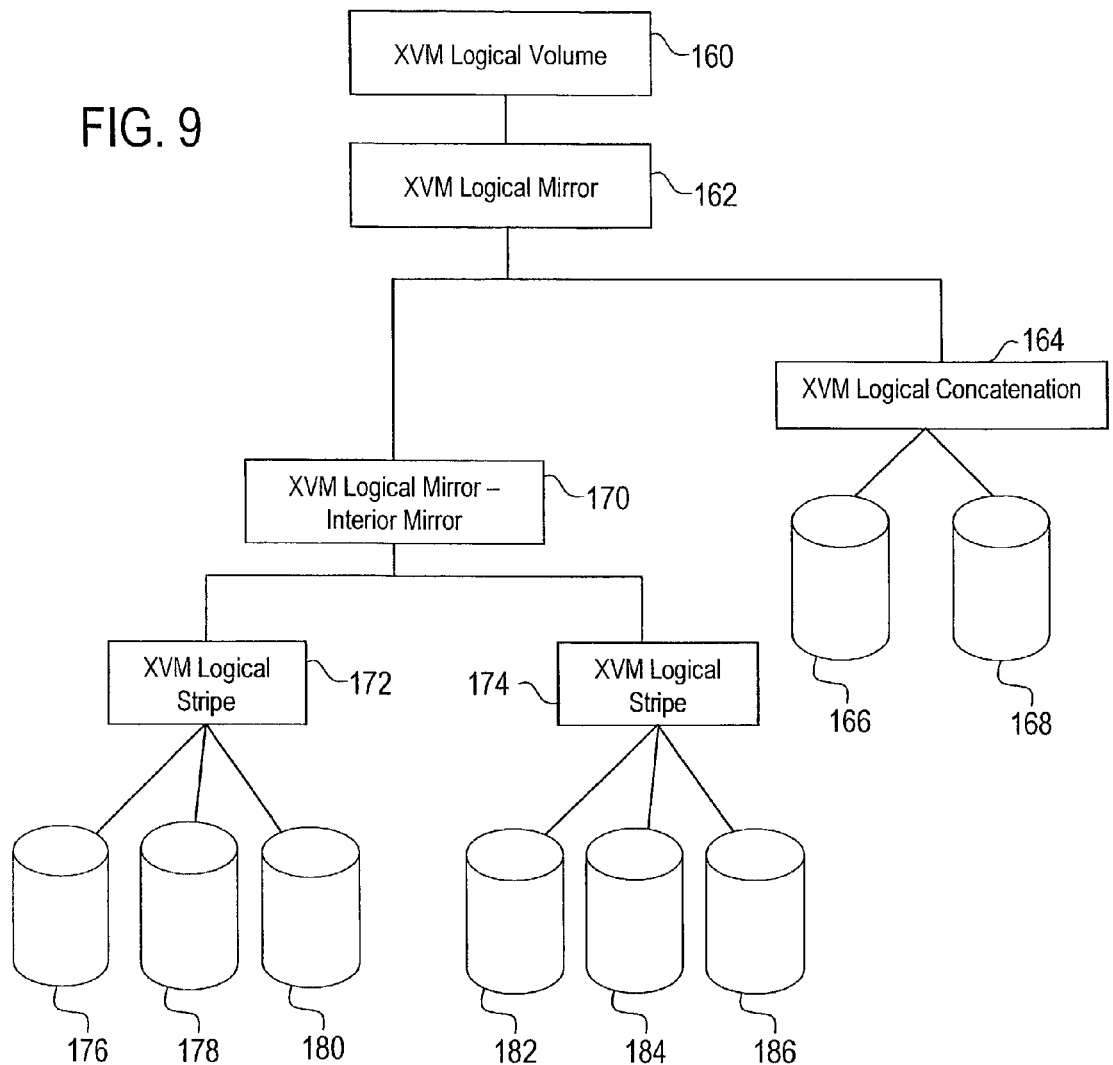
FIG. 9 is a block diagram of a mirrored data volume.

One aspect of the present invention that increases the availability of data is the mirroring of data volumes in mass storage 28. As in the case of conventional mirroring, during normal operation the same data is written to multiple devices. Mirroring may be used in conjunction with striping in which different portions of a data volume are written to different disks to increase speed of access. Disk concatenation can be used to increase the size of a logical volume. Preferably, the volume manager allows any combination of striping, concatenation and mirroring. FIG. 9 provides an example of a volume 160 that has a mirror 162 with a leg 164 that is a concatenation of data on two physical disks 166, 168 and an interior mirror 170 of two legs 172, 174 that are each striped across three disks 176, 178, 180 and 182, 184, 186.

The volume manager may have several servers which operate independently, but are preferably chosen using the same logic. A node is selected from the nodes that have been in the cluster membership the longest and are capable of hosting the server. From that pool of nodes the lowest numbered node is chosen. The volume manager servers are chosen at cluster initialization time or when a server failure occurs. In an exemplary embodiment, there are four volume manager servers, termed boot, config, mirror and pal.

The volume manager exchanges configuration information at cluster initialization time. The boot server receives configuration information from all client nodes. Some of the client nodes could have different connectivity to disks and thus, could have different configurations. The boot server merges the configurations and distributes changes to each client node using a volume manager multicast facility. This facility preferably ensures that updates are made on all nodes in the cluster or none of the nodes using two-phase commit logic. After cluster initialization it is the config server that coordinates changes. The mirror server maintains the mirror specific state information about whether a revive is needed and which mirror legs are consistent.

In a cluster system according to the present invention, all data volumes and their mirrors in mass storage 28 are accessible from any node in the cluster. Each mirror has a node assigned to be its mirror master. The mirror master may be chosen using the same logic as the mirror server with the additional constraint that it must have a physical connection to the disks. During normal operation, queues may be maintained for input/output operations for all of the client nodes by the mirror master to make the legs of the mirror consistent across the cluster. In the event of data loss on one of the disk drives forming mass storage 28, a mirror revive process is initiated by the mirror master, e.g., node 22c (FIG. 2), which detects the failure and is able to execute the mirror revive process.

If a client node, e.g., node 22a, terminates abnormally, the mirror master node 22c will search the mirror input/output queues for outstanding input/output operations from the failed node and remove the outstanding input/output operations from the queues. If a write operation from a failed process to a mirrored volume is in a mirror input/output queue, a mirror revive process is initiated to ensure that mirror consistency is maintained. If the mirror master fails, a new mirror master is selected and the mirror revive process starts at the beginning of the mirror of a damaged data volume and continues to the end of the mirror.

When a mirror revive is in progress, the mirror master coordinates input/output to the mirror. The mirror revive process uses an overlap queue to hold I/O requests from client nodes made during the mirror revive process. Prior to beginning to read from an intact leg of the mirror, the mirror revive process ensures that all other input/output activity to the range of addresses is complete. Any input/output requests made to the address range being revived are refused by the mirror master until all the data in that range of addresses has been written by the mirror revive process.

If there is an I/O request for data in an area that is currently being copied in reconstructing the mirror, the data access is retried after a predetermined time interval without informing the application process which requested the data access. When the mirror master node 22c receives a message that an application wants to do input/output to an area of the mirror that is being revived, the mirror master node 22c will reply that the access can either proceed or that the I/O request overlaps an area being revived. In the latter case, the client node will enter a loop in which the access is retried periodically until it is successful, without the application process being aware that this is occurring.

Input/output access to the mirror continues during the mirror revive process with the volume manager process keeping track of the first unsynchronized block of data to avoid unnecessary communication between client and server. The client node receives the revive status and can check to see if it has an I/O request preceding the area being synchronized. If the I/O request precedes that area, the I/O request will be processed as if there was no mirror revive in progress.

Data read from unreconstructed portions of the mirror by applications are preferably written to the copy being reconstructed, to avoid an additional read at a later period in time. The mirror revive process keeps track of what blocks have been written in this manner. New data written by applications in the portion of the mirror that already have been copied by the mirror revive process are mirrored using conventional mirroring. If an interior mirror is present, it is placed in writeback mode. When the outer revive causes reads to the interior mirror, it will automatically write to all legs of the interior mirror, thus synchronizing the interior mirror at the same time.

Recovery and Relocation

Figure 10:
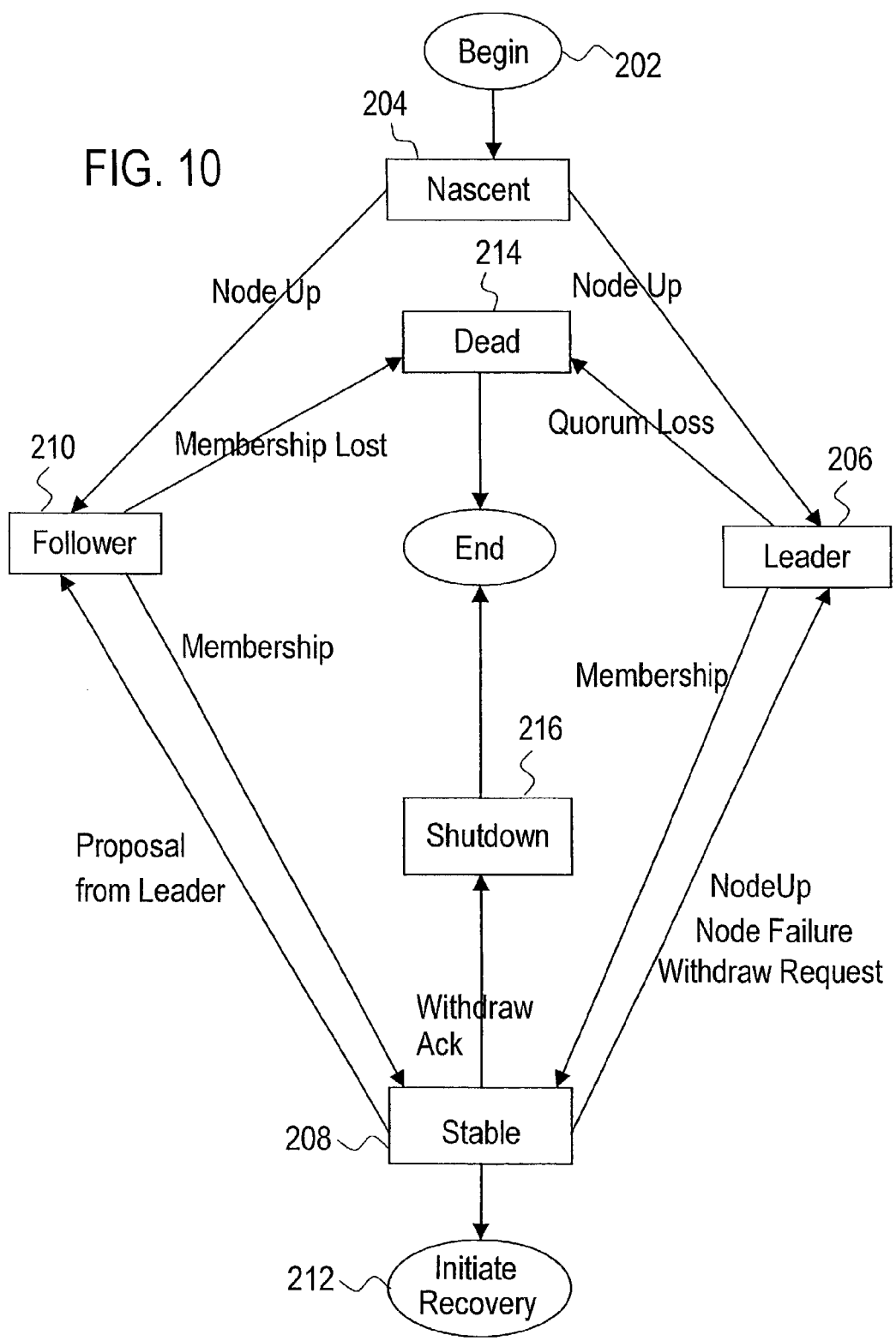
FIG. 10 is a state machine diagram of cluster membership.

In the preferred embodiment, a common object recovery protocol (CORPSE) is used for server endurance. As illustrated in FIG. 10, if a node executing a metadata server fails, the remaining nodes will become aware of the failure from loss of heartbeat, error in messaging or by delivery of a new cluster membership excluding the failed node. The first step in recovery or initiation of a cluster is to determine the membership and roles of the nodes in the cluster. If the heartbeat signal is lost from a node or a new node is detected in the cluster, a new membership must be determined. To enable a computer system to access a cluster filesystem, it must first be defined as a member of the cluster, i.e., a node, in that filesystem.

As illustrated in FIG. 10, when a node begins 202 operation, it enters a nascent state 204 in which it detects the heartbeat signals from other nodes and begins transmitting its own heartbeat signal. When enough heartbeat signals are detected to indicate that there are sufficient operating nodes to form a viable cluster, requests are sent for information regarding whether there is an existing membership for the cluster. If there is an existing leader for the cluster, the request(s) will be sent to the node in the leader state 206. If there is no existing leader, conventional techniques are used to elect a leader and that node transitions to the leader state 206. For example, a leader may be selected that has been a member of the cluster for the longest period of time and is capable of being a metadata server.

The node in the leader state 206 sends out messages to all of the other nodes that it has identified and requests information from each of those nodes about the nodes to which they are connected. Upon receipt of these messages, nodes in the nascent state 204 and stable state 208 transition to the follower state 210. The information received in response to these requests is accumulated by the node in the leader state 206 to identify the largest set of fully connected nodes for a proposed membership. Identifying information for the nodes in the proposed membership is then transmitted to all of the nodes in the proposed membership. Once all nodes accept the membership proposed by the node in the leader state 206, all of the nodes in the membership transition to the stable state 208 and recovery is initiated 212 if the change in membership was due to a node failure. If the node in the leader state 206 is unable to find sufficient operating nodes to form a cluster, i.e., a quorum, all of the nodes transition to a dead state 214.

If a node is deactivated in an orderly fashion, the node sends a withdrawal request to the other nodes in the cluster, causing one of the nodes to transition to the leader state 206. As in the case described above, the node in the leader state 206 sends a message with a proposed membership causing the other nodes to transition to the follower state 210. If a new membership is established, the node in the leader state 206 sends an acknowledgement to the node that requested withdrawal from membership and that node transitions to a shutdown state 216, while the remaining nodes transition to the stable state 208.

Figure 11:
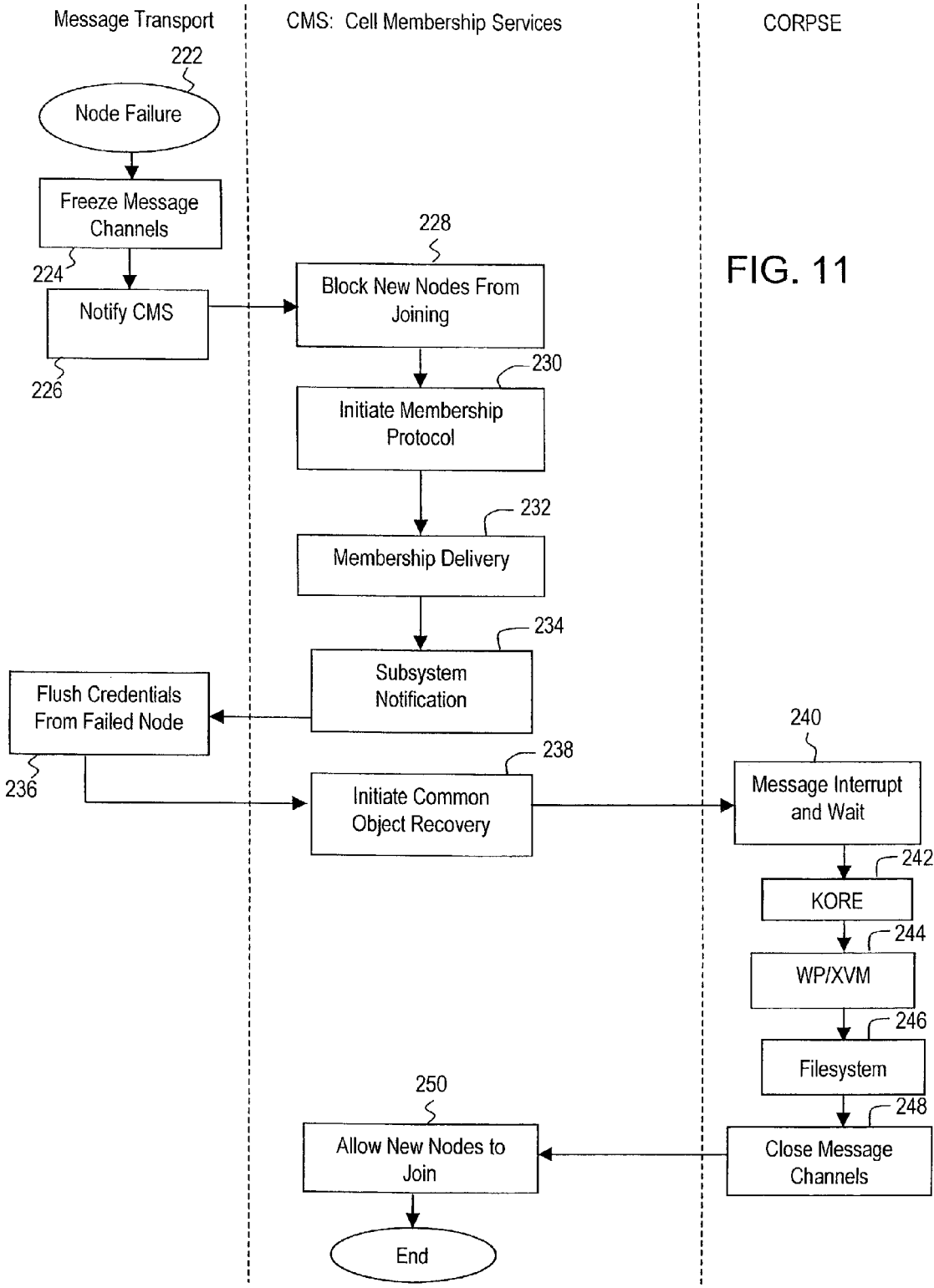
FIG. 11 is a flowchart of a process for recovering from the loss of a node.

In the stable state 208, message channels are established between the nodes 22, 24, 26 over LAN 34. A message transport layer in the operating system handles the transmission and receipt of messages over the message channels. One set of message channels is used for general messages, such as token requests and metadata. Another set of channels is used just for membership. If it is necessary to initiate recovery 212, the steps illustrated in FIG. 11 are performed. Upon detection of a node failure 222, by loss of heartbeat or messaging failure, the message transport layer in the node detecting the failure freezes 224 the general message channels between that node and the failed node and disconnects the membership channels. The message transport layer then notifies 226 the cell membership services (CMS) daemon.

Upon notification of a node failure, the CMS daemon blocks 228 new nodes from joining the membership and initiates 230 the membership protocol represented by the state machine diagram in FIG. 10. A leader is selected and the process of membership delivery 232 is performed as discussed above with respect to FIG. 10.

In the preferred embodiment, CMS includes support for nodes to operate under different versions of the operating system, so that it is not necessary to upgrade all of the nodes at once. Instead, a rolling upgrade is used in which a node is withdrawn from the cluster, the new software is installed and the node is added back to the cluster. The time period between upgrades may be fairly long, if the people responsible for operating the cluster want to gain some experience using the new software.

Version tags and levels are preferably registered by the various subsystems to indicate version levels for various functions within the subsystem. These tags and levels are transmitted from follower nodes to the CMS leader node during the membership protocol 230 when joining the cluster. The information is aggregated by the CMS leader node and membership delivery 232 includes the version tags and levels for any new node in the cluster. As a result all nodes in the know the version levels of functions on other nodes before any contact between them is possible so they can properly format messages or execute distributed algorithms.

Upon initiation 212 of recovery, the following steps are performed. The first step in recovery involves the credential service subsystem. The credential subsystem caches information about other nodes, so that each service request doesn't have to contain a whole set of credentials. As the first step of recovery, the CMS daemon notifies 234 the credential subsystem in each of the nodes to flush 236 the credentials from the failed node.

When the CMS daemon receives acknowledgment that the credentials have been flushed, common object recovery is initiated 238. Details of the common object recovery protocol for server endurance (CORPSE) will be described below with respect to FIG. 12. An overview of the CORPSE process is illustrated in FIG. 11, beginning with the interrupting 240 of messages from the failed node and waiting for processing of these messages to complete. Messages whose service includes a potentially unbounded wait time are returned with an error.

After all of the messages from the failed node have been processed, CORPSE recovers the system in three passes starting with the lowest layer (cluster infrastructure) and ending with the file system. In the first pass, recovery of the kernel object relocation engine (KORE) is executed 242 for any in-progress object relocation involving a failed node. In the second pass, the distributed name server (white pages) and the volume manager, such as XVM, are recovered 244 making these services available for filesystem recovery. In the third pass the file system is recovered 246 to return all files to a stable state based on information available from the remaining nodes. Upon completion of the third pass, the message channels are closed 248 and new nodes are allowed 250 to join.

Figure 12:
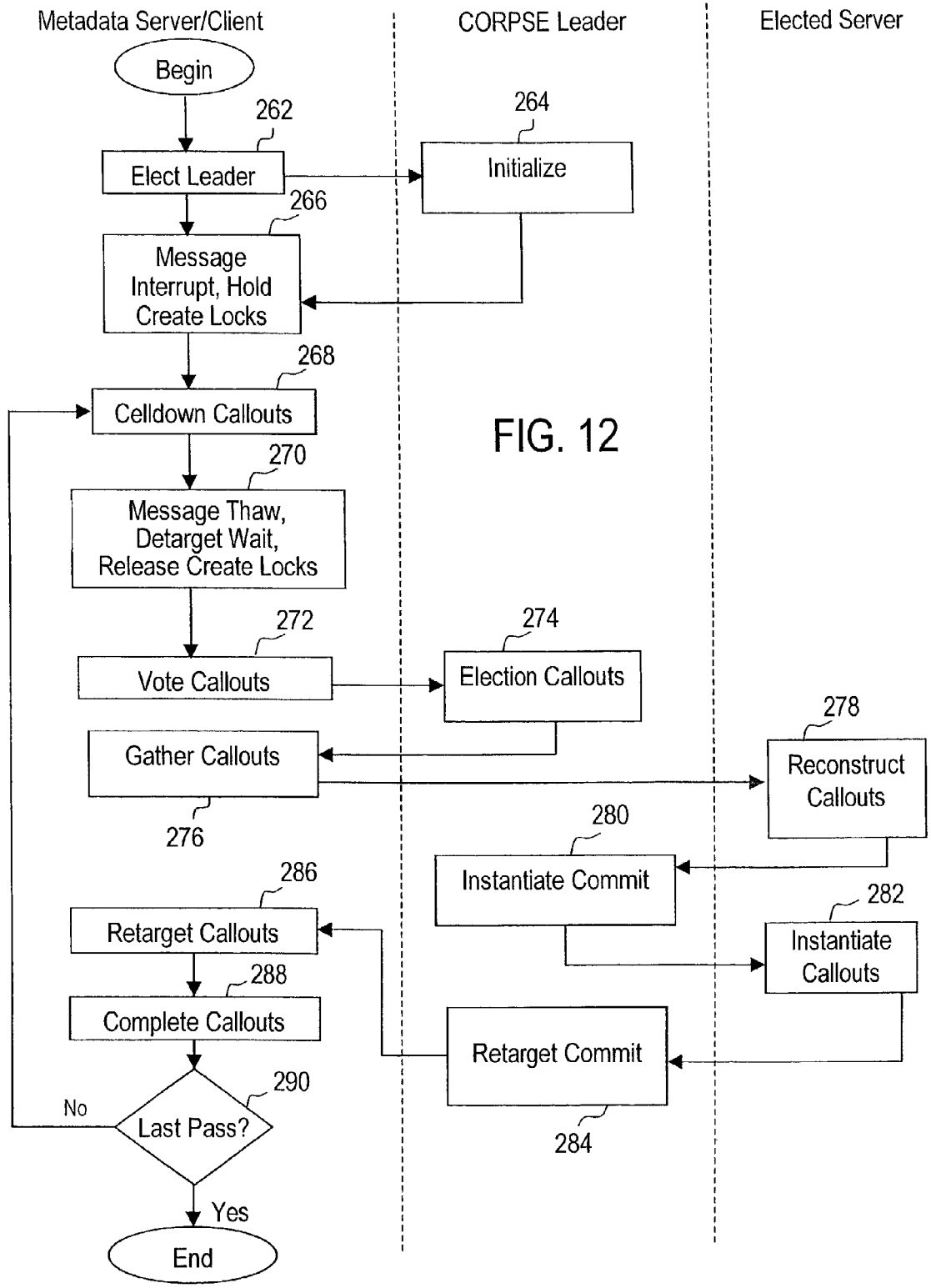
FIG. 12 is a flowchart of a common object recovery protocol.

As illustrated in FIG. 12, the first step in CORPSE is to elect 262 a leader for the purposes of recovery. The CORPSE leader is elected using the same algorithm as described above with respect to the membership leader 206. In the event of another failure before recovery is completed, a new leader is elected 262. The node selected as the CORPSE leader initializes 264 the CORPSE process to request the metadata client processes on all of the nodes to begin celldown callouts as described below. The purpose of initialization is to handle situations in which another node failure is discovered before a pass is completed. First, the metadata server(s) and clients initiate 266 message interrupts and holds all create locks.

The next step to be performed includes detargeting a chandle. A chandle or client handle is a combination of a barrier lock, some state information and an object pointer that is partially subsystem specific. A chandle includes a node identifier for where the metadata server can be found and a field that the subsystem defines which tells the chandle how to locate the metadata server on that node, e.g., using a hash address or an actual memory address on the node. Also stored in the chandle is a service identifier indicating whether the chandle is part of the filesystem, vnode file, or distributed name service and a multi-reader barrier lock that protects all of this. When a node wants to send a message to a metadata server, it acquires a hold on the multi-reader barrier lock and once that takes hold the service information is decoded to determine where to send the message and the message is created with the pointer to the object to be executed once the message reaches the metadata server.

With messages interrupted and create locks held, celldown callouts are performed 268 to load object information into a manifest object and detarget the chandles associated with the objects put into the manifest. By detargeting a chandle, any new access on the associated object is prevented. The create locks are previously held 266 on the objects needed for recovery to ensure that the objects are not instantiated for continued processing on a client node in response to a remote processing call (RPC) previously initiated on a failed metadata server. An RPC is a thread initiated on a node in response to a message from another node to act as a proxy for the requesting node. In the preferred embodiment, RPCs are used to acquire (or recall) tokens for the requesting node. During celldown callouts 268 the metadata server recovers from any lost clients, returning any tokens the client(s) held and purging any state held on behalf of the client.

The CORPSE subsystems executing on the metadata clients go through all of the objects involved in recovery and determine whether the server for that client object is in the membership for the cluster. One way of making this determination is to examine the service value in the chandle for that client object, where the service value contains a subsystem identifier and a server node identifier. Object handles which identify the subsystems and subsystem specific recovery data necessary to carry out further callouts are placed in the manifest. Server nodes recover from client failure during celldown callouts by returning failed client tokens and purging any state associated with the client.

When celldown callouts have been performed 268 for all of the objects associated with a failed node, the operations frozen 266 previously are thawed or released 270. The message channel is thawed 270, so that any threads that are waiting for responses can receive error messages that a cell is down, i.e., a node has failed, so that that the threads can do any necessary cleanup and then drop the chandle hold. This allows all of the detargets to be completed. In addition, the create locks are released 270. The final result of the operations performed in step 270 is that all client objects associated with the filesystem are quiesced, so that no further RPCs will be sent or are awaiting receipt.

After the celldown callouts 268 have processed the information about the failed node(s), vote callouts are performed 272 in each of the remaining nodes to elect a new server. The votes are sent to the CORPSE leader which executes 274 election callouts to identify the node(s) that will host the new servers. The election algorithm used is subsystem specific. The filesystem selects the next surviving node listed as a possible server for the filesystem, while the DNS selects the oldest server capable node.

When all of the nodes are notified of the results of the election, gather callouts are performed 276 on the client nodes to create manifests for each server on the failed node(s). Each manifest contains information about one of the servers and is sent to the node elected to host that server after recovery. A table of contents of the information in the bag is included in each manifest, so that reconstruct callouts can be performed 278 on each object and each manifest from each of the nodes.

The reconstruct callouts 278 are executed on the new elected server to extract information from the manifests received from all the nodes while the chandles are detargeted, so that none of the nodes attempt to access the elected server. When the reconstruct callouts 278 are completed, a message is sent to the CORPSE leader that it is ready to commit 280 to instantiate the objects of the server. The instantiate callouts are then performed 282 and upon instantiation of all of the objects, a commitment 284 is sent to the CORPSE leader for retargeting the chandles to the elected server. The instantiate commit 280 and retarget commit 284 are performed by the CORPSE leader, to save information regarding the extent of recovery, in case there is another node failure prior to completion of a pass. If a failure occurs prior to instantiate commit 280, the pass is aborted and recovery is restarted with freezing 224 of message channels. However, once the CORPSE leader notifies any node to go forward with instantiating 282 new server(s), recovery of any new node failure is delayed until the current pass completes, then recovery rolls back to freezing 224 message channels. If the failed node contains the elected server, the client nodes are targeted to the now-failed server and the process of recovering the server begins again.

In the case of the second pass, WP/XVM 244, a single chandle accesses the DNS server and the manifest created at each client node contains all of the file identifiers in use at that node prior to entering recovery. During the reconstruct callouts 278 of the second pass, the DNS server goes through all of the entries in the manifest and creates a unique entry for each filesystem identifier it receives. If duplicate entries arrive, which is likely since many nodes may have the entry for a single filesystem, tokens are allocated for the sending node in the previously created entry.

After all of the retargets are performed 286 in each of the nodes, a complete callout is performed 288 by the subsystem being recovered to do any work that is required at that point. Examples are deallocating memory used during recovery or purging any lingering state associated with a failed node, including removing DNS entries still referencing a failed node. As discussed above with respect to FIG. 11, the steps illustrated in FIG. 12 are preferably repeated in three passes as different subsystems of the operating system are recovered. After completion 290 of the last pass, CORPSE is completed.

Kernel Object Relocation Engine

As noted above, the first pass 242 of recovery is to recover from an incomplete relocation of a metadata server. The kernel object relocation engine (KORE) is used for an intentional relocation of the metadata server, e.g. for an unmount of the server or to completely shutdown a node at which a metadata server is located, to return the metadata server to a previously failed node, or for load shifting. Provided no nodes fail, during relocation an object manifest can be easily created, since all of the information required for the new, i.e., target, metadata server can be obtained from the existing, i.e., source, metadata server.

Figure 13:
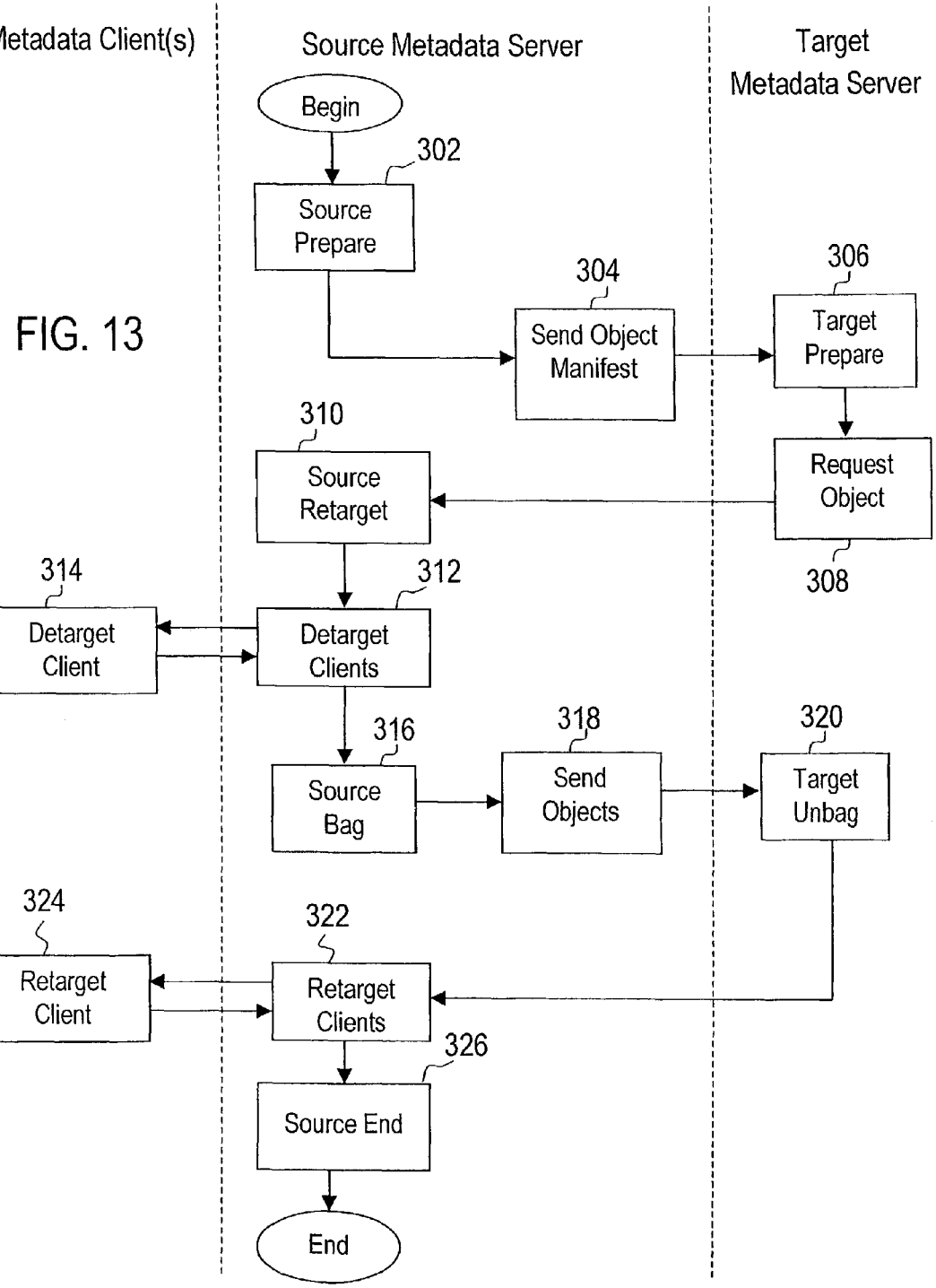
FIG. 13 a flowchart of a kernel object relocation engine.

As illustrated in FIG. 13, KORE begins with source node prepare phase 302, which ensures that filesystem is quiesced before starting the relocation. When all of the objects of the metadata server are quiesced, they are collected into an object manifest and sent 304 to the target metadata server. Most of the steps performed by the target metadata server are performed in both relocation and recovery. The target node is prepared 306 and an object request is sent 308 from the target metadata server to the source metadata server to obtain a bag containing the state of the object being relocated.

In response, the source metadata server initiates 310 retargeting and creation of client structures (objects) for the vnodes and the vfs, then all clients are informed 312 to detarget 314 that node as the metadata server. When the source metadata server has been informed that all of the clients have completed detargeting 314, a source bag is generated 316 with all of the tokens and the state of server objects which are sent 318 to the target metadata server. The target metadata server unbags 320 the objects and initiates execution of the metadata server. The target metadata server informs the source metadata server to inform 322 the clients to retarget 324 the target metadata server and processing resumes on the target metadata server. The source metadata server is informed when each of the clients completes retargeting 324, so that the source node can end 326 operation as the metadata server.

Figure 14A:
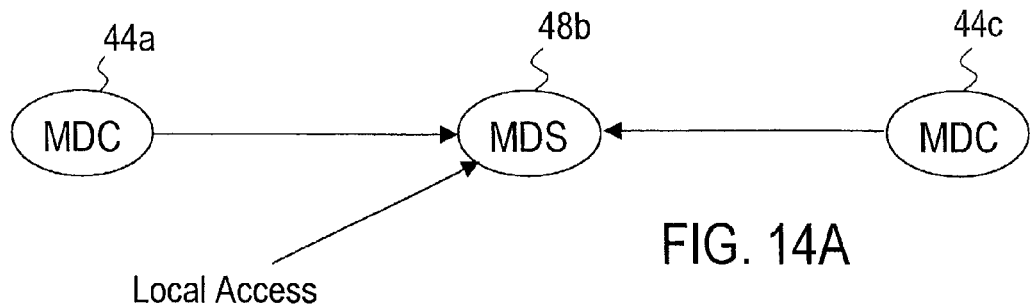
FIGS. 14A-14H are a sequence of state machine diagrams of server relocation.
Figure 14B:
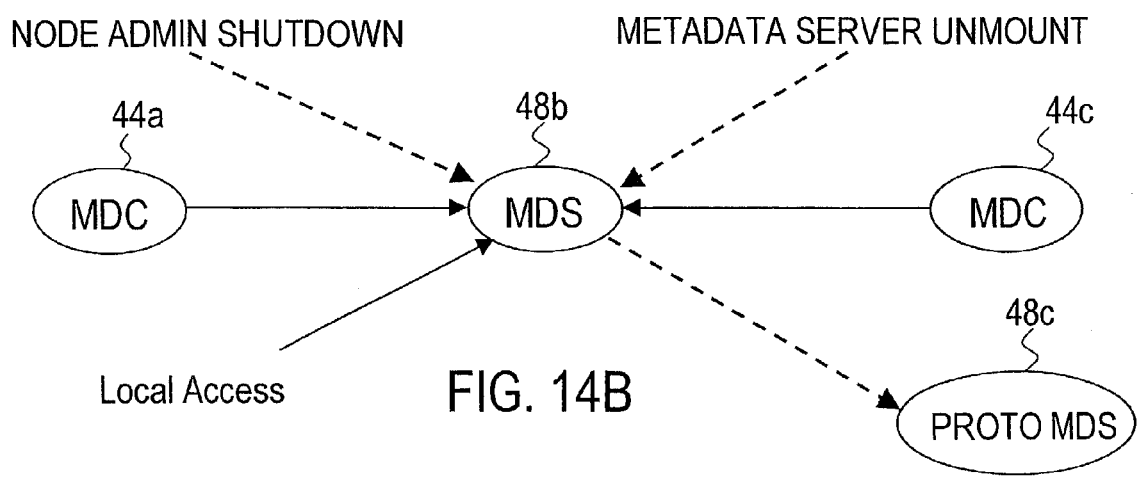
Figure 14C:
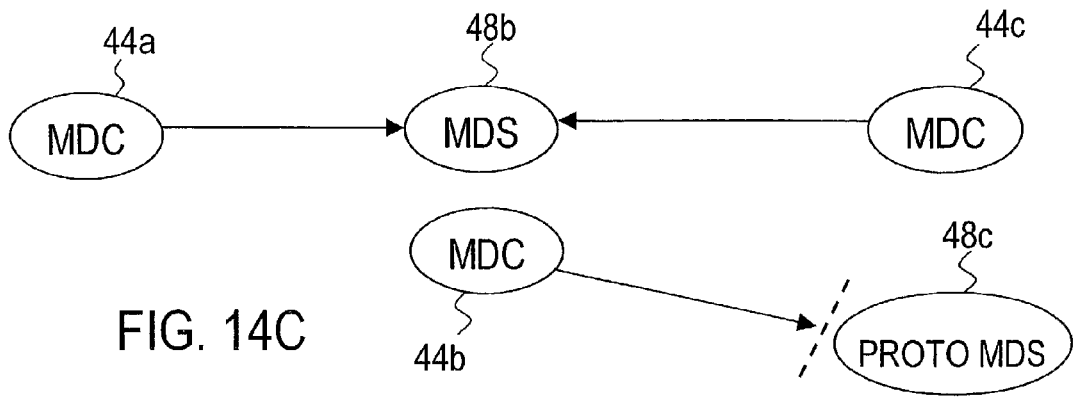
Figure 14D:
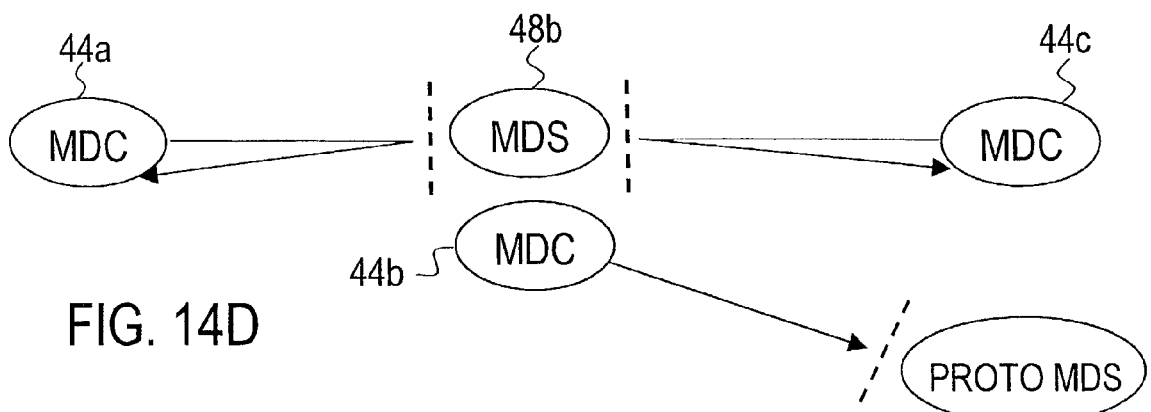
Figure 14E:
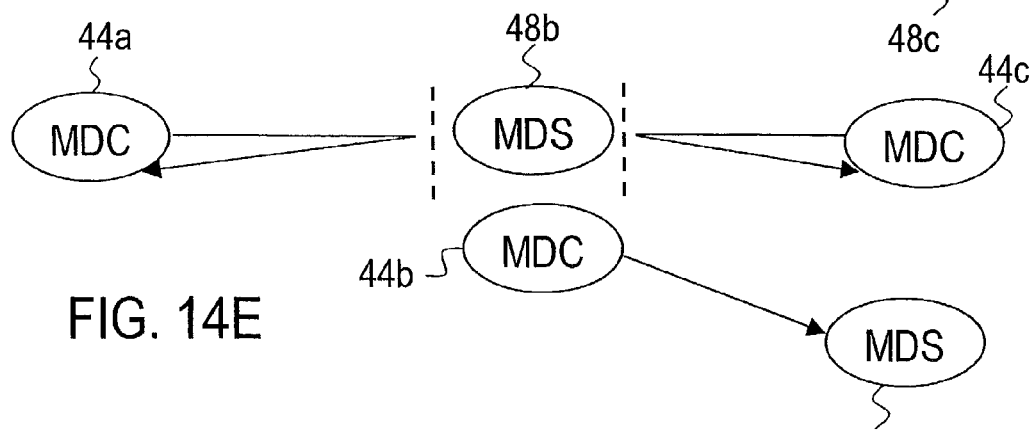
Figure 14F:
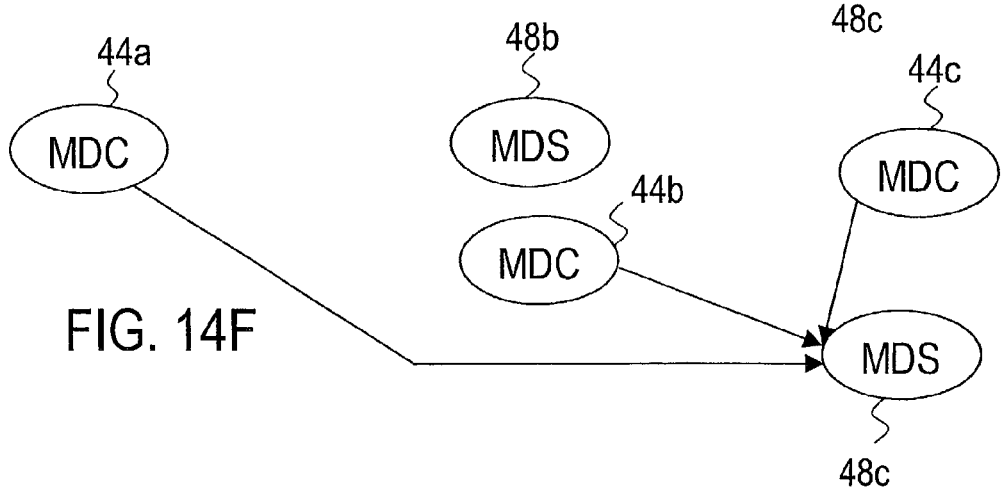
Figure 14G:
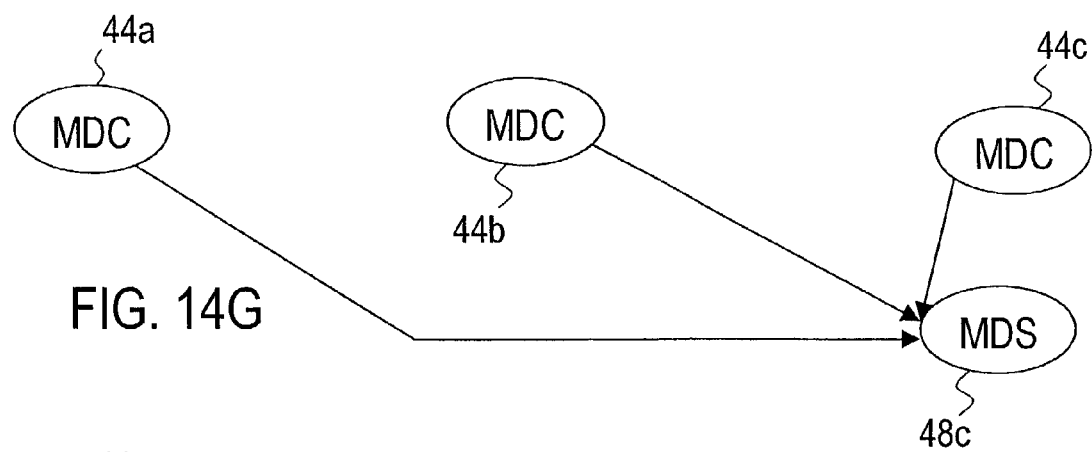
Figure 14H:
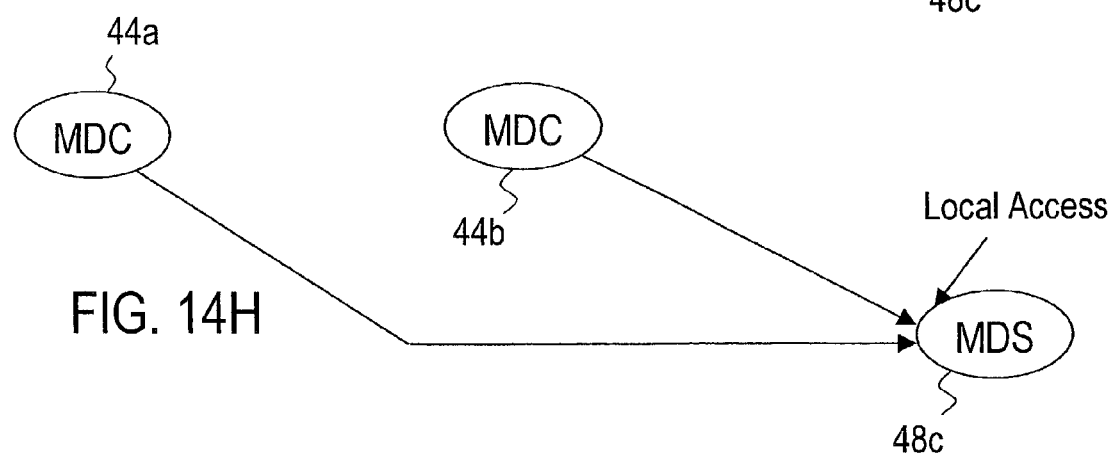

The stages of the relocation process are illustrated in FIGS. 14A-14H. As illustrated in FIG. 14A, during normal operation the metadata clients (MDCs) 44a and 44c at nodes 22a and 22c send token requests to metadata server (MDS) 48b on node 22b. When a relocation request is received, metadata server 48b sends a message to node 22c to create a prototype metadata server 48c as illustrated in FIG. 14B. A new metadata client object is created on node 22b, as illustrated in FIG. 14C, but initially messages to the prototype metadata server 48c are blocked. Next, all of the metadata clients 44a are instructed to detarget messages for the old metadata server 48b, as illustrated in FIG. 14D. Then, as illustrated in FIG. 14E, the new metadata server 48c is instantiated and is ready to process the messages from the clients, so the old metadata server 48b instructs all clients to retarget messages to the new metadata server 48c, as illustrated in FIG. 14F. Finally, the old metadata server 48b node 22b is shut down as illustrated in FIG. 14G and the metadata client 44c is shut down on node 22c as illustrated in FIG. 14H. As indicated in FIG. 3, the token client 46c continues to provide local access by processing tokens for applications on node 22c, as part of the metadata server 48c.

Interruptible Token Acquisition

Preferably interruptible token acquisition is used to enable recovery and relocation in several ways: (1) threads processing messages from failed nodes that are waiting for the token state to stabilize are sent an interrupt to be terminated to allow recovery to begin; (2) threads processing messages from failed nodes which may have initiated a token recall and are waiting for the tokens to come back are interrupted; (3) threads that are attempting to lend tokens which are waiting for the token state to stabilize and are blocking recovery/relocation are interrupted; and (4) threads that are waiting for the token state to stabilize in a filesystem that has been forced offline due to error are interrupted early. Threads waiting for the token state to stabilize first call a function to determine if they are allowed to wait, i.e. none of the factors above apply, then go to sleep until some other thread signals a change in token state.

To interrupt, CORPSE and KORE each wake all sleeping threads. These threads loop, check if the token state has changed and if not attempt to go back to sleep. This time, one of the factors above may apply and if so a thread discovering it returns immediately with an "early" status. This tells the upper level token code to stop trying to acquire, lend, etc. and to return immediately with whatever partial results are available. This requires processes calling token functions to be prepared for partial results. In the token acquisition case, the calling process must be prepared to not get the token(s) requested and to be unable to perform the intended operation. In the token recall case, this means the thread will have to leave the token server data structure in a partially recalled state. This transitory state is exited when the last of the recalls comes in, and the thread returning the last recalled token clears the state. In lending cases, the thread will return early, potentially without all tokens desired for lending.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of transmitting a message over a network connecting a cluster of computer system nodes running different operating systems, comprising:
   receiving a message at a receiver computer system node from the network;
   determining at the receiver computer system node whether the message needs to be converted, the message being received from the network in a common wire format or a format compatible with the receiver computer system node;
   converting the message to the format compatible with the receiver computer system node in a single layer of a computer messaging protocol by the receiving computer system node in response to the message being in the common wire format;
   bypassing message conversion in response to the message being in the format compatible with the receiver computer system node.

2. A method as recited in claim 1, wherein the network is a storage area network, and
   wherein said converting performs binary conversion at a low level of the messaging protocol.

3. A method as recited in claim 2, wherein the messaging protocol supports transmission of messages after conversion by a sending node to a common wire format, but does not require all messages to be in the common wire format.

4. A method as recited in claim 3, wherein when the receiving computer system node operates on data in a format known by the sending node, the sending node may perform said converting.

5. A method as recited in claim 4, further comprising sending the message without converting when the format used by the receiving computer system node is also used by the sending node and is different from the common wire format.

6. A method as recited in claim 5, further comprising transmitting a heartbeat signal in the common wire format using a heartbeat layer of the messaging protocol, and
   wherein the low level of the messaging protocol where said converting of the message by the receiving computer system node occurs is immediately above the heartbeat layer.

7. A method as recited in claim 6, wherein the single layer is defined by a set of entry and exit points where all conversion of message formats occur.

8. A method as recited in claim 5, wherein the nodes in the network include nodes having different endian processors.

9. A method as recited in claim 8, wherein the sending and receiving nodes have different endian processors and the receiving computer system node is responsible for performing said converting even if data operated on by the receiving computer system node is same endian as the common wire format.

10. At least one non-transitory computer readable medium storing at least one program embodying a method of transmitting a message over a network connecting a cluster of computer system nodes running different operating systems, comprising:
   a. receiving a message at a receiver computer system node from the network;
   b. determining at the receiver computer system node whether the message needs to be converted, the message being received from the network in a common wire format or a format compatible with the receiver computer system node;
   c. converting the message to the format compatible with the receiver computer system node in a single layer of a computer messaging protocol by the receiving computer system node in response to the message being in the common wire format;
   d. bypassing message conversion in response to the message being in the format compatible with the receiver computer system node.

11. At least one non-transitory computer readable medium as recited in claim 10, wherein the network is a storage area network, and wherein said converting performs binary conversion at a low level of the messaging protocol.

12. At least one non-transitory computer readable medium as recited in claim 11, wherein the messaging protocol supports transmission of messages after conversion by a sending node to a common wire format, but does not require all messages to be in the common wire format.

13. At least one non-transitory computer readable medium as recited in claim 12, wherein when the receiving node operates on data in a format known by the sending node, the sending node may perform said converting.

14. At least one non-transitory computer readable medium as recited in claim 13, further comprising sending the message without converting when the format used by the receiving node is also used by the sending node and is different from the common wire format.

15. At least one non-transitory computer readable medium as recited in claim 14,
   a. wherein said method further comprises transmitting a heartbeat signal in the common wire format using a heartbeat layer of the messaging protocol, and
   b. wherein the low level of the messaging protocol where said converting of the message by the receiving node occurs is immediately above the heartbeat layer.

16. At least one non-transitory computer readable medium as recited in claim 15, wherein the single layer is defined by a set of entry and exit points where all conversion of message formats occur.

17. At least one non-transitory computer readable medium as recited in claim 14, wherein the nodes in the network include nodes having different endian processors.

18. At least one non-transitory computer readable medium as recited in claim 17, wherein the sending and receiving nodes have different endian processors and the receiving node is responsible for performing said converting even if data operated on by the receiving node is same endian as the common wire format.

19. A cluster of computer systems, comprising:
   a storage area network having a computer messaging protocol with a plurality of layers; and
   computer system nodes, coupled to said storage area network and running different operating systems, to transmit messages over the storage area network for receipt by a receiving node, to determine whether each of the messages needs to be converted by the receiving node and to convert the messages, at a low level of the computer messaging protocol by the receiving node, if required for further processing by the receiving node, the message being received from the network in a common wire format or a format compatible with the receiving node, and to convert only those messages not in the format compatible with the receiving node.

20. A cluster of computer systems as recited in claim 19, wherein the computer system nodes include first nodes having big endian processors and second nodes having little endian processors and whichever of the first and second nodes that are different endian than a common wire format transmit at least some of the messages therebetween without conversion to the common wire format.

21. A method as recited in claim 1, wherein the computer messaging protocol is not used in a Digital Private Network Signaling System or an Integrated Services Digital Network.

22. A method as recited in claim 4, further comprising determining by said receiving computer system node whether said converting by the receiving computer system node is required.

\* \* \* \* \*